(12) United States Patent
Seo et al.

(10) Patent No.: US 7,599,611 B2
(45) Date of Patent: Oct. 6, 2009

(54) RECORDING MEDIUM, AND METHOD AND APPARATUS OF REPRODUCING DATA RECORDED ON THE SAME

(75) Inventors: Kang Soo Seo, Anyang-si (KR); Jea Yong Yoo, Seoul (KR); Byung Jin Kim, Seongnam-si (KR)

(73) Assignee: LG Electronics Co., Seoul (KR)

( * ) Notice: Subject to any disclaimer, the term of this patent is extended or adjusted under 35 U.S.C. 154(b) by 672 days.

(21) Appl. No.: 11/224,282

(22) Filed: Sep. 13, 2005

(65) Prior Publication Data

US 2006/0056805 A1 Mar. 16, 2006

Related U.S. Application Data

(60) Provisional application No. 60/608,895, filed on Sep. 13, 2004.

(30) Foreign Application Priority Data

Oct. 11, 2004 (KR) .................. 10-2004-0080897

(51) Int. Cl.
*H04N 5/00* (2006.01)
(52) U.S. Cl. .................. 386/126; 386/46; 386/124; 386/125
(58) Field of Classification Search .................. 386/46, 386/95, 124–126, 52, 55; 348/231.2
See application file for complete search history.

(56) References Cited

U.S. PATENT DOCUMENTS

| | | | |
|---|---|---|---|
| 5,644,782 A | 7/1997 | Yeates et al. | |
| 5,930,768 A | 7/1999 | Hooban | |
| 5,982,980 A | 11/1999 | Tada | |
| 6,021,438 A | 2/2000 | Duvvoori et al. | |
| 6,269,371 B1 | 7/2001 | Ohnishi | |
| 6,775,803 B1 | 8/2004 | Chung et al. | |
| 6,928,613 B1 | 8/2005 | Ishii et al. | |
| 7,308,189 B2 | 12/2007 | Ando et al. | |
| 2002/0161571 A1 | 10/2002 | Matsushima et al. | |
| 2003/0072453 A1 | 4/2003 | Kelly et al. | |
| 2003/0105743 A1 | 6/2003 | Ireton | |
| 2003/0190148 A1 | 10/2003 | Lee | |
| 2003/0202431 A1 | 10/2003 | Kim et al. | |
| 2003/0228134 A1 | 12/2003 | Kim et al. | |
| 2003/0235402 A1 | 12/2003 | Seo et al. | |

(Continued)

FOREIGN PATENT DOCUMENTS

CA 2373641 9/2001

(Continued)

OTHER PUBLICATIONS

International Search Report dated Mar. 23, 2006.

(Continued)

*Primary Examiner*—Thai Tran
*Assistant Examiner*—Mishawn Dunn
(74) *Attorney, Agent, or Firm*—Harness, Dickey & Pierce

(57) ABSTRACT

A recording medium includes a data area and a data management area. The data area includes first and second titles which have different data formats with respect to each other. The data management area includes a plurality of data management files required for reproducing the first and second titles. The data management files include a first object file which contains first management information associated with reproduction of the first title, and a second object file which contains second management information associated with reproduction of the second title. For example, the first title is a movie title and the second title is a Java title, and the first object file is a movie object and the second object file is one or more Java object files.

23 Claims, 18 Drawing Sheets

U.S. PATENT DOCUMENTS

| | | |
|---|---|---|
| 2003/0235406 A1 | 12/2003 | Seo et al. |
| 2004/0047588 A1 | 3/2004 | Okada et al. |
| 2004/0051812 A1 | 3/2004 | Hayward |
| 2004/0054541 A1 | 3/2004 | Kryze et al. |
| 2004/0081434 A1 | 4/2004 | Jung et al. |
| 2004/0101285 A1 | 5/2004 | Seo et al. |
| 2004/0184778 A1 | 9/2004 | Jung et al. |
| 2004/0210584 A1 | 10/2004 | Nir et al. |
| 2005/0025461 A1 | 2/2005 | Kato et al. |
| 2005/0105888 A1 | 5/2005 | Hamada et al. |
| 2005/0108466 A1 | 5/2005 | Takashima et al. |
| 2005/0196142 A1 | 9/2005 | Park et al. |
| 2005/0198071 A1 | 9/2005 | Yoo et al. |
| 2005/0198115 A1 | 9/2005 | Sugimoto et al. |
| 2006/0013562 A1 | 1/2006 | Sugino et al. |
| 2006/0045481 A1 | 3/2006 | Yahata et al. |
| 2006/0051062 A1 | 3/2006 | Kusaka et al. |
| 2006/0140079 A1 | 6/2006 | Hamada et al. |
| 2006/0143666 A1 | 6/2006 | Okada et al. |
| 2006/0153535 A1 | 7/2006 | Chun et al. |
| 2006/0227973 A1 | 10/2006 | Takashima et al. |
| 2006/0282775 A1 | 12/2006 | Yahata et al. |
| 2007/0217305 A1 | 9/2007 | Seo et al. |

FOREIGN PATENT DOCUMENTS

| | | |
|---|---|---|
| CN | 1111873 | 11/1995 |
| CN | 1179589 | 4/1998 |
| CN | 1898742 A | 1/2007 |
| EP | 0 737 912 A2 | 3/1996 |
| EP | 0 737 975 | 10/1996 |
| EP | 0801384 A2 | 10/1997 |
| EP | 1 032 229 | 8/2000 |
| EP | 1 408 505 | 4/2004 |
| EP | 1 426 961 | 6/2004 |
| EP | 1 437 737 | 7/2004 |
| EP | 1 513 152 | 3/2005 |
| EP | 1 524 669 | 4/2005 |
| EP | 1 536 427 A1 | 6/2005 |
| EP | 1 553 769 | 7/2005 |
| EP | 1 718 074 | 11/2006 |
| JP | 11-065996 | 3/1999 |
| JP | 11-249948 | 9/1999 |
| JP | 11-249963 | 9/1999 |
| JP | 11288580 A | 10/1999 |
| JP | 2002-288941 | 10/2002 |
| JP | 2004-214918 | 7/2004 |
| JP | 2006-40473 | 2/2006 |
| KR | 10-2004-039885 | 5/2004 |
| RU | 2233011 | 7/2004 |
| TW | 583538 | 4/2004 |
| WO | WO 95/12197 | 5/1995 |
| WO | WO 96/11446 | 4/1996 |
| WO | WO 01/67668 | 9/2001 |
| WO | WO 04/001752 | 12/2003 |
| WO | WO 04/001754 A1 | 12/2003 |
| WO | WO 2004/023479 | 3/2004 |
| WO | WO 2004/030356 | 4/2004 |
| WO | WO 2004/042723 | 5/2004 |
| WO | WO 2004/047100 | 6/2004 |
| WO | WO 2004/047104 | 6/2004 |
| WO | WO 2004/074976 | 9/2004 |
| WO | WO 2004/077436 | 9/2004 |
| WO | WO 2004/114658 | 12/2004 |
| WO | WO 2005/002220 | 1/2005 |
| WO | WO 2005/050528 | 6/2005 |
| WO | WO 2005/052941 | 6/2005 |
| WO | WO 2005/055205 | 6/2005 |
| WO | WO 2005/078727 | 8/2005 |
| WO | WO 2005/091637 | 9/2005 |
| WO | WO 2005/124763 | 12/2005 |

OTHER PUBLICATIONS

International Search Report dated Apr. 18, 2007.
European Search Report dated Sep. 17, 2008 corresponding to European Application No. 05823683.7.
Chinese Office Action dated Aug. 8, 2008 corresponding to Chinese Application No. 200580031490.0.
Search Report for corresponding European Application No. 05787044.6 dated Jan. 29, 2009.
Office Action for Russian Application No. 2007109793 dated Apr. 28, 2009 and English translation thereof.
Office Action for Chinese Application No. 200580030565.3 dated May 8, 2009 and English translation thereof.
Office Action for Chinese Application No. 200580032007.0 dated May 8, 2009 and English translation thereof.

RECORDING MEDIUM, AND METHOD AND APPARATUS OF REPRODUCING DATA RECORDED ON THE SAME

This application claims the benefit of U.S. Provisional Application No. 60/608,895, filed on Sep. 13, 2004, in the name of inventors Kang Soo SEO, Jea Yong YOO, and Byung Jin KIM, entitled "METHOD OF CONFIGURING FILE STRUCTURE IN BLU-RAY DISC", which is hereby incorporated by reference as if fully set forth herein.

This application claims the benefit of the Korean Patent Application No. 10-2004-0080897, filed on Oct. 11, 2004, which is hereby incorporated by reference as if fully set forth herein.

BACKGROUND OF THE INVENTION

1. Field of the Invention

The present invention relates to a recording medium, and more particularly, to a recording medium, and a method and apparatus of reproducing data recorded on the same.

2. Discussion of the Related Art

Optical discs are widely used as a recording medium for recording mass data. Presently, among a wide range of optical discs, a new high density recording medium, such as a blu-ray disc (hereinafter referred to as "BD"), is under development for recording (or writing) and storing high definition video and audio data for a long period of time. Currently, the blu-ray disc (BD), which is known to be the next generation recording medium technology, is under development as a next generation optical recording solution that is capable of recording data significantly surpassing the conventional DVD, along with many other digital apparatuses. A global standard for the specification of such technology is also under discussion and development.

Most particularly, diverse data having different attributes may also be recorded in the blu-ray disc (BD). Examples of such data would be titles having motion picture data recorded therein in MPEG-2 format, titles having interactive information including motion picture data, which are executed (or played-back) by java programs, recorded therein, titles that are recorded in web programming language, and so on. However, in the current BD standard, universal standardization details for reproducing (or playing-back) the above-described data (i.e., titles) having different attributes are yet to be consolidated, there are many restrictions in the full-scale development of a blu-ray disc (BD)-based optical recording and/or reproducing apparatus.

SUMMARY OF THE INVENTION

Accordingly, the present invention is directed to a recording medium, and a method and apparatus of reproducing data recorded on the same that substantially obviate one or more problems due to limitations and disadvantages of the related art.

An object of the present invention is to provide a recording medium in which diverse data having different attributes can be recorded and to provide a new file structure for managing reproduction of such data.

Another object of the present invention is to provide a method and apparatus for reproducing data suitable for such recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium includes a data area including first and second titles having different data formats, and a data management area including a plurality of data management files for reproduction of the first and second titles, wherein the data management files include a first object file containing first management information associated with reproduction of the first title, and a second object file including second management information associated with reproduction of the second title.

In another aspect of the present invention, a recording medium includes a data area including a movie title and a Java title, and a data management area including a movie object file having management information for reproduction of the movie title, at least one Java object file having management information for reproduction of the Java title, and an index file having index information of the movie title and the Java title.

In another aspect of the present invention, a recording medium includes a data area including a movie title and a Java title, and a data management area including a movie object file having management information for reproduction of the movie title, at least one Java object file having management information for reproduction of the Java title, a first index file having index information of the movie title, and a second index file having index information of the movie title and the Java title.

In another aspect of the present invention, a recording medium includes a data area including a movie title and a Java title, and a data management area including a movie object file having management information for reproduction of the movie title, and an index file having index information of the movie title and the Java title, wherein the data management area further includes a Java program file having Java object information associated with reproduction of the Java title.

In another aspect of the present invention, a method of reproducing data recorded on a recording medium which includes a data area having first and second titles having different data formats and a data management area having management information for reproducing the first and second titles, includes extracting index information of the first and second titles from the data management area, executing a first object associated with reproduction of the first title and designated by the index information when a command for reproducing the first title is inputted, and executing a second object associated with reproduction of the second title and designated by the index information when a command for reproducing the second title is inputted.

In a further aspect of the present invention, an apparatus of reproducing data recorded on a recording medium which includes a data area having first and second titles having different data formats and a data management area having management information for reproducing the first and second titles, includes a microcomputer to generate a control signal to read index information of the first and second titles which is contained in at least one index file, and to read object information of the first and second titles which is contained in at least one object file, the at least one index file and the at least one object file being included in the data management area, and a player model to reproduce a title selected by a user using the index and object information extracted from the data management area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
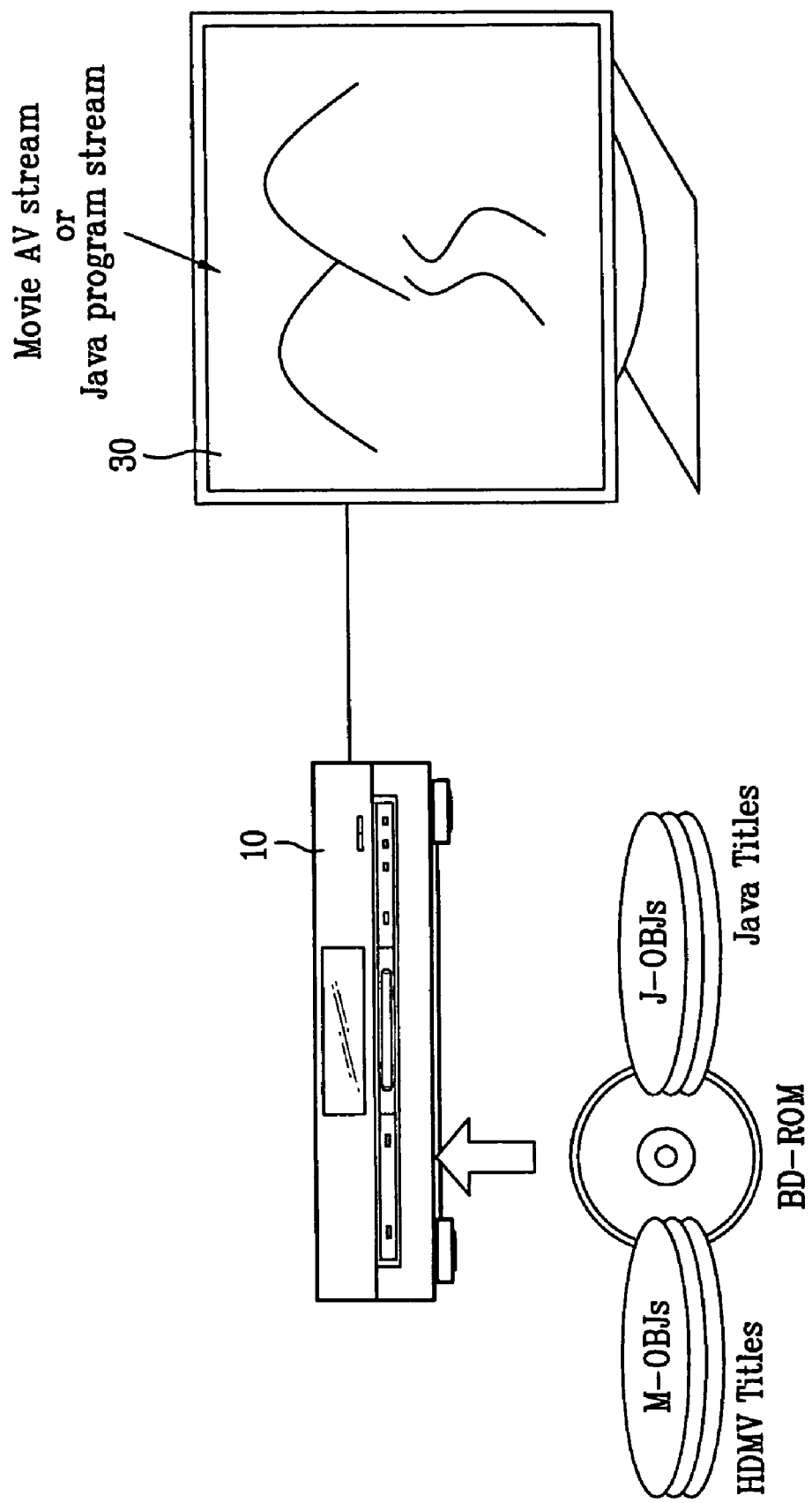
FIG. 1 illustrates each title recorded on a recording medium according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

In the present invention, a "title" refers to a reproduction (or playback) unit forming an interface with the user. More specifically, the title according to the present invention is linked with a specific object. And, a stream associated with the corresponding title recorded on the optical disc is reproduced in accordance with a command or program within the object. Accordingly, a relationship between the title recorded on the optical disc and a file structure within the optical disc for reproducing the title will be described in detail with reference to FIG. 2. More specifically, in order to simplify the description of the present invention, among the titles recorded on the optical disc, a title having motion picture data and/or interactive information recorded therein will be referred to as a "High Definition Movie (HDMV) title" or a "movie title". A title having motion picture data and interactive information, which are executed by a Java program, are recorded therein is referred to as a "Java title".

Furthermore, in the present invention, an "object" refers to a reproduction management information including a command or program for reproducing the optical disc. More specifically, various types of objects exist within the disc, wherein each object is either linked with a specific title or inter-linked with other objects within the disc. Therefore, a wide range of disc reproduction scenarios may be provided. In other words, the object according to the present invention may be viewed as a reproduction unit including a command or program for managing a reproduction scenario of the data recorded on the optical disc. Accordingly, the object for reproducing the "HDMV title" is referred to as a "Movie Object" or "M-OBJ", and the object for reproducing the "Java title" is referred to as a "Java Object" or "J-OBJ". Furthermore, a file including the object information is referred to as an object file, which will be described in detail in a later process.

FIG. 1 provides a conceptual understanding of the present invention. More specifically, FIG. 1 illustrates an example of reproducing a read-only blu-ray disc (BD-ROM) through an optical recording and/or reproducing device 10. Particularly, FIG. 1 illustrates an example of when the titles recorded on the BD-ROM consist of a combination of HDMV titles and Java titles (which is referred to as a "Full mode"). The present invention is to provide a standardized file structure within the optical disc as well as a method and apparatus for reproducing such file structure, in order to reproduce the BD-ROM, which is recorded in "Full mode".

Accordingly, the optical recording and/or reproducing device 10 of the present invention can record or reproduce data on or from optical discs of various standards. And, depending upon its design, the optical recording and/or reproducing device 10 may either record/reproduce optical discs of only one particular standard (e.g., the blu-ray disc (BD)) or only reproduce data and not perform any recording of data. In the present invention, an example of a player (i.e., BD-Player) for reproducing the read-only blu-ray disc (i.e., BD-ROM). Herein, a plurality of titles is recorded on the BD-ROM in accordance with the format of the BD-ROM. It is apparent that the optical recording and/or reproducing apparatus 10 can also be referred to as a "driver" which may be equipped in computers.

Apart from the function of reproducing the blu-ray disc (BD-ROM), the optical recording and/or reproducing apparatus 10 according to the present invention also has the function of reading the data within the BD-ROM, performing signal processing and decoding in accordance with the read data, and transmitting the decoded signal to a display 30, which is connected to the optical recording and/or reproducing apparatus 10, so as to transmit the signal to a user through a display screen. Accordingly, the optical recording and/or reproducing apparatus 10 is primarily designed to reproduce all titles that are recorded within the BD-ROM, each of the titles having attributes different from one another. However, the optical recording and/or reproducing apparatus 10 may reproduce titles of specific attributes only (e.g., HDMV titles), which will be described in detail with reference to FIG. 7A to FIG. 8B.

Figure 2:
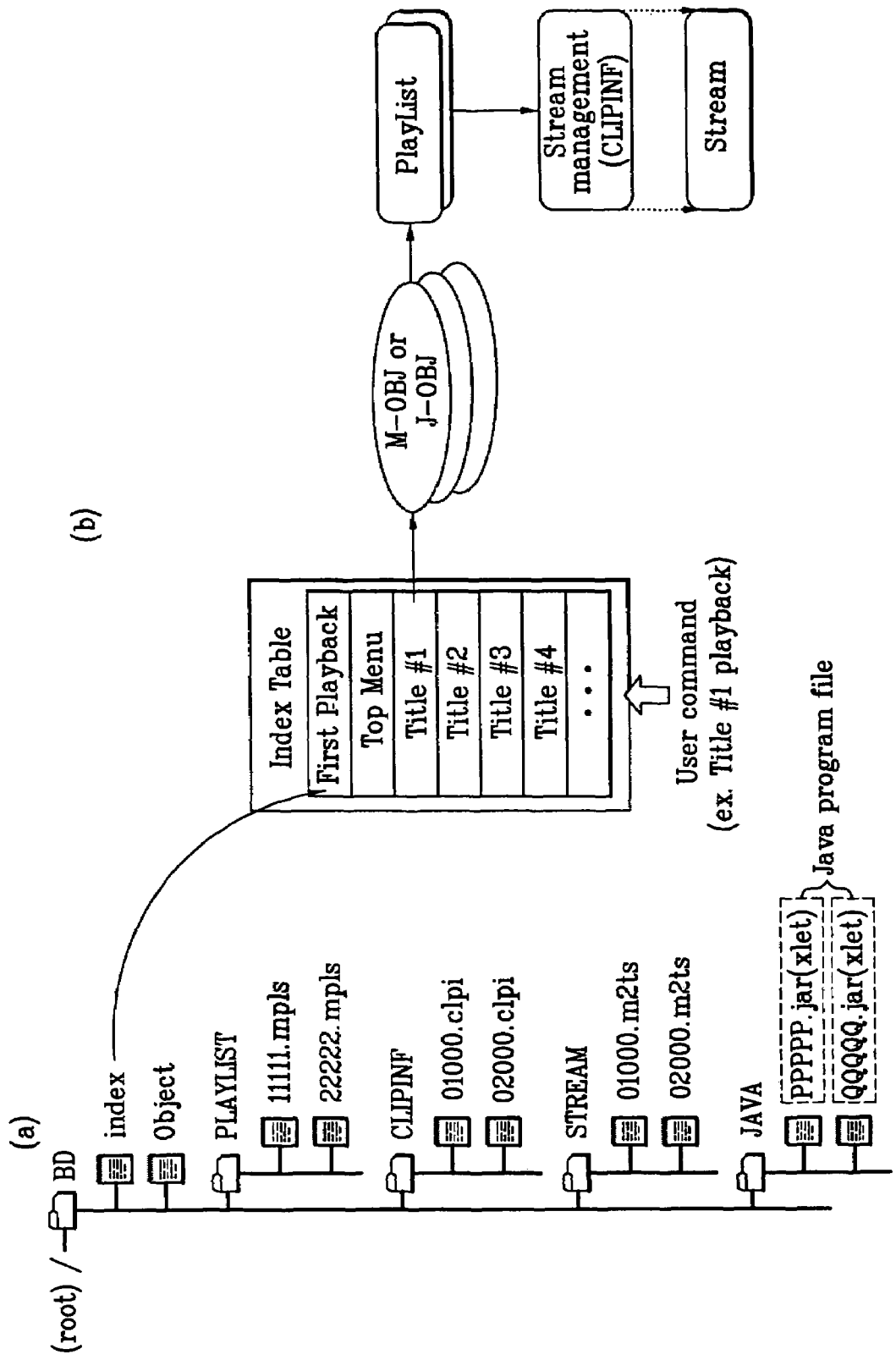
FIG. 2 illustrates a file structure recorded on the recording medium (i.e., optical disc) and its relationship for reproducing data according to the present invention.

FIG. 2 illustrates a file structure (a) recorded on the recording medium (e.g., BD-ROM) and the relationship (b) between each file within the file structure (a) when reproducing a specific title from the file structure (a) according to the present invention. The file structure (a) of FIG. 2 will now be described in detail.

In the reproduction management file structure (a), at least one BD directory (BD directory) is included in a root directory. Each BD directory includes an index file ("index") and an object file ("Object"), which ensure interactivity with one or more users. Each BD directory includes three file directories including data to be reproduced, and information required for reproducing the data. The file directories included in each BD directory are a stream directory (STREAM), a playlist directory (PLAYLIST), and a clip information directory (CLIPINF). The BD directory also includes a Java directory (JAVA) which consists of one or more Java program files. Hereinafter, the above-mentioned directories and the files included in each directory will be described in detail. Also, the directory names and the file names used for describing the file structure according to the present invention are only examples, which are used to simplify the description of the file structure.

Referring to FIG. 2, the stream directory includes a plurality of stream files recorded in specific formats within the optical disc. Generally, motion picture data, audio data, interactive graphic data, or text subtitle data is recorded within each stream file. Additionally, the clip information directory (CLIPINF) includes clip information files (01000.clpi, 02000.clpi) being in one-to-one correspondence with each of the stream files included in the stream directory. A clip information file (*.clpi) includes property information and timing information of a corresponding stream file. More specifically, a stream file (*.m2ts) and a clip information file (*.clpi) that is in one-to-one correspondence with the stream file are collectively referred to as a "clip". In other words, a clip information file (*.clpi) corresponding to each stream file (*.m2ts) must exist.

Referring back to FIG. 2, the playlist directory (PLAYLIST) includes one or more PlayList files (*.mpls), wherein each PlayList file (*.mpls) includes at least one PlayItem which designates playing interval for a specific clip. In other words, a PlayItem includes information designating presentation start and end times (IN-Time and OUT-Time) of a specific clip. Herein, the specific clip is designated by a clip_Information_File_name within the PlayItem. The PlayList file (*.mpls) reproduces a desired clip from a combination of one or more PlayItems. Further, the PlayList file (*.mpls) also includes a SubPlayItem for reproducing data (most particularly, sub data) that is different from the data reproduced by the PlayItem.

More specifically, the PlayList file is operated (or executed) only by the command of the above-described object. Accordingly, from the perspective of a disc reproduction scenario, the Object executes or manages a dynamic scenario, and the PlayList file (*.mpls) executes or manages a static scenario. Furthermore, the Java directory (JAVA) includes Java program files (e.g., PPPPP.jar or QQQQQ.jar). Various types of applications are programmed in each Java program file, which is particularly referred to as an "Xlet". The Java program file is processed by a Java-specific reproduction means, which will be described in detail in a later process with reference to FIG. 9B.

Referring to FIG. 2, part (b) illustrates the relationship of a specific title being reproduced by the file structure (a) also shown in FIG. 2. Accordingly, the relationship of a corresponding title being reproduced when a title reproduction command made by a user, which is particularly for a specific title provided to an index table configured based on an index file, is inputted will now be described in detail. Herein, the index file includes a "First Playback" information, a "Top-Menu" information, and at least one "Title" (i.e., Title #1 to Title #4) information. The First PlayBack information includes information on a image that is first displayed when a corresponding disc is loaded, and the TopMenu information provides (or displays) a menu screen. Herein, the title (i.e., Title #1 to Title #4) may be configured of any one of an HDMV title and a Java title.

In a later process, when the user selects a specific title (e.g., Title #1), a specific PlayList is reproduced in accordance with a command or program of a specific object that is linked with the selected Title #1 within the Object file of the file structure (a). Also, a specific clip (configured of "*.clpi" and "*.m2ts") is reproduced by a PlayItem within the PlayList. Accordingly, if the selected title (e.g., Title #1) is an HDMV title, the title is reproduced by a specific "M-OBJ" included in one of the object files. Alternatively, if the selected title (e.g., Title #1) is a Java title, a specific "J-OBJ" is used for reproduction. More specifically, the present invention seeks to provide various exemplary embodiments on the method of configuring the above-described objects ("M-OBJ" and "J-OBJ") according to the present invention, which will be described in detail with reference to FIG. 4A to FIG. 6B. Furthermore, the index file may either be configured of a single index file (e.g., FIG. 8A and FIG. 8B) or be configured of a first index file including index information on only the HDMV titles, and a second index file including information on both the HDMV titles and the Java titles (e.g., FIG. 7A and FIG. 7B). This will be described in more detail with reference to FIG. 7A to FIG. 8B.

Figure 3:
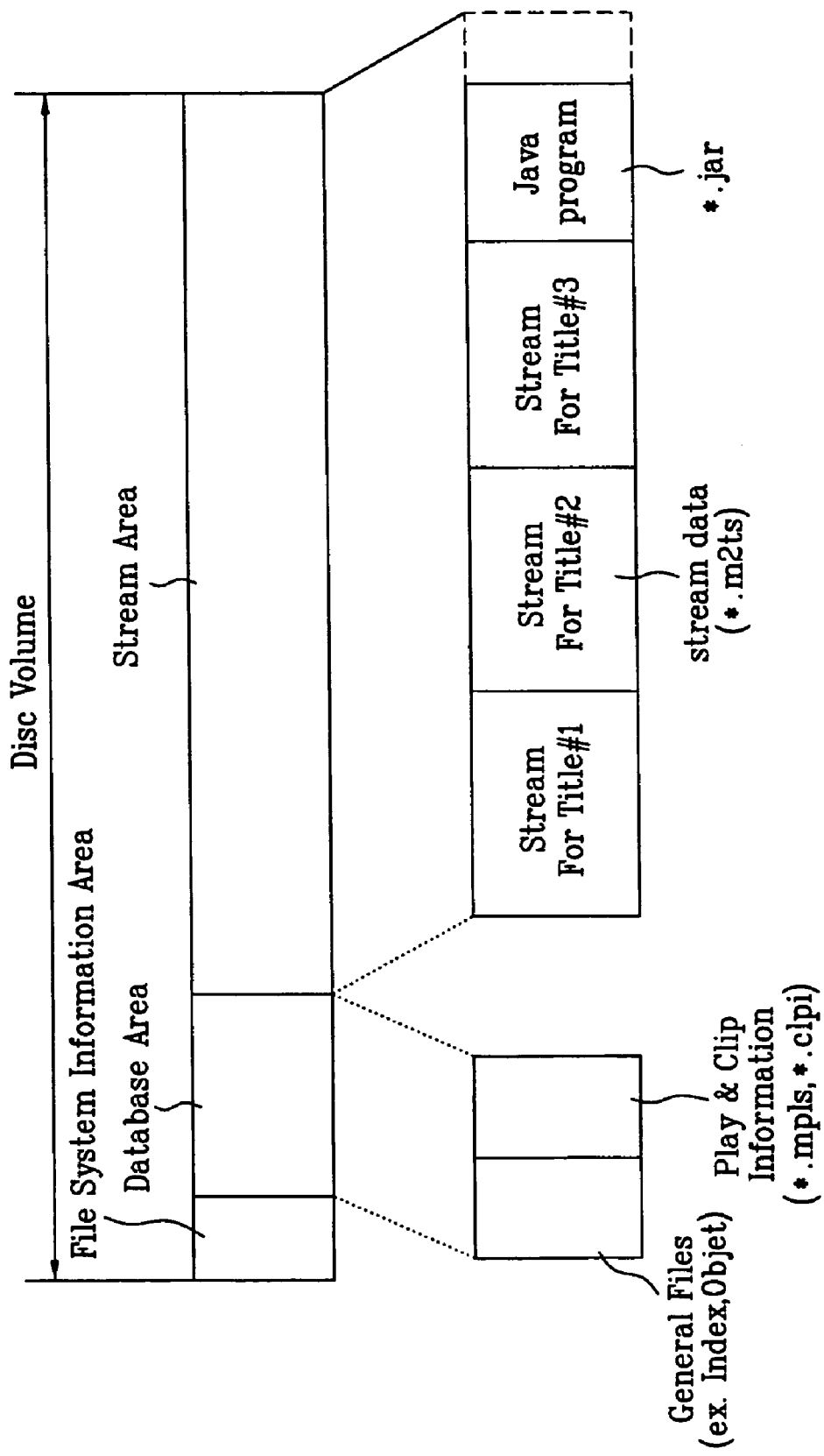
FIG. 3 illustrates a recording structure of data recorded on the recording medium (i.e., optical disc) according to the present invention.

FIG. 3 illustrates an exemplary structure of the information associated with the file structure (a) being recorded within the optical disc. More specifically, starting from the inner circumference (or center) of the disc, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, main data such as audio/video/graphic data are recorded in the stream area. Disc reproduction management files, such as index files, object files, PlayList files, and clip information files, are recorded in the database area of the disc volume. Further, an area in which the HDMV titles and the Java titles according to the present invention are recorded is referred to as a "Title recording area". This area corresponds to the stream area shown in FIG. 3. An area for recording information and files for reproducing the titles is referred to as a "management area". This area corresponds to the File system information area and the database area shown in FIG. 3. Herein, each area shown in FIG. 3 is only exemplary, and, therefore, the alignment of each of the areas is not limited to the structure shown in FIG. 3.

Figure 4A:
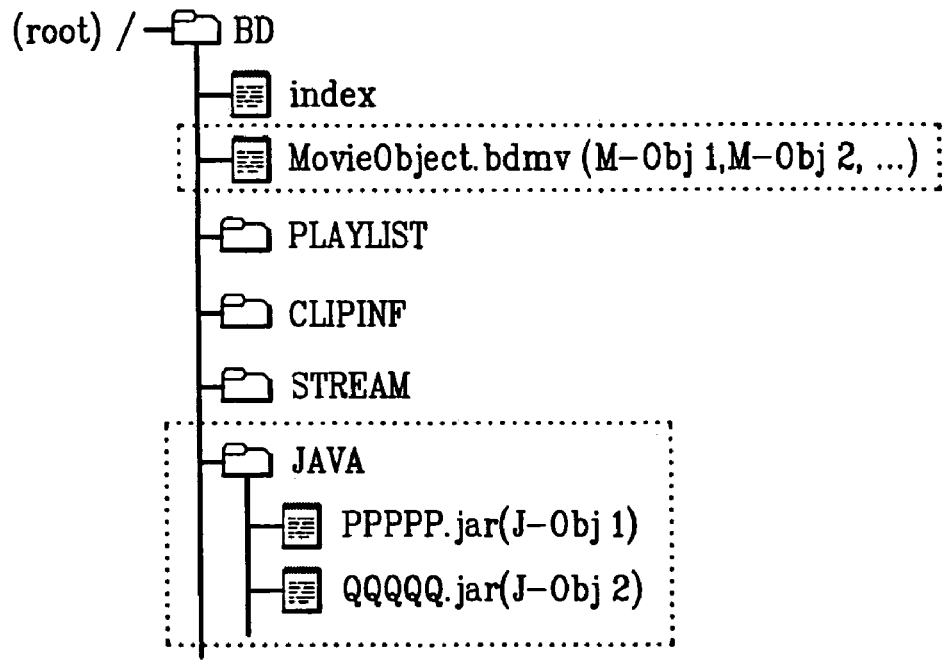
FIGS. 4A and 4B illustrate a file structure recorded on the optical disc according to a first embodiment of the present invention.
Figure 4B:
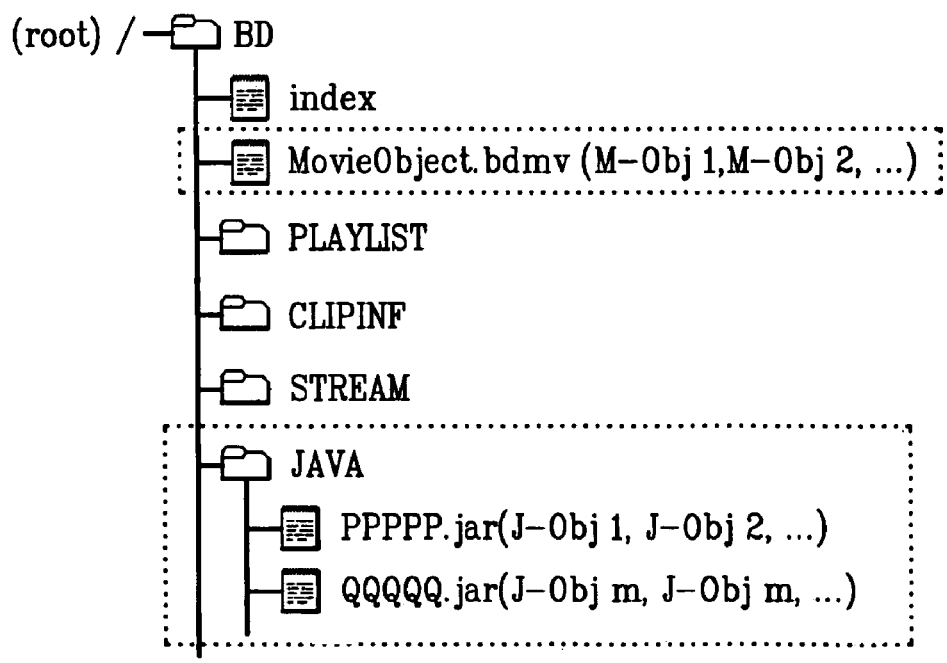
Figure 4C:
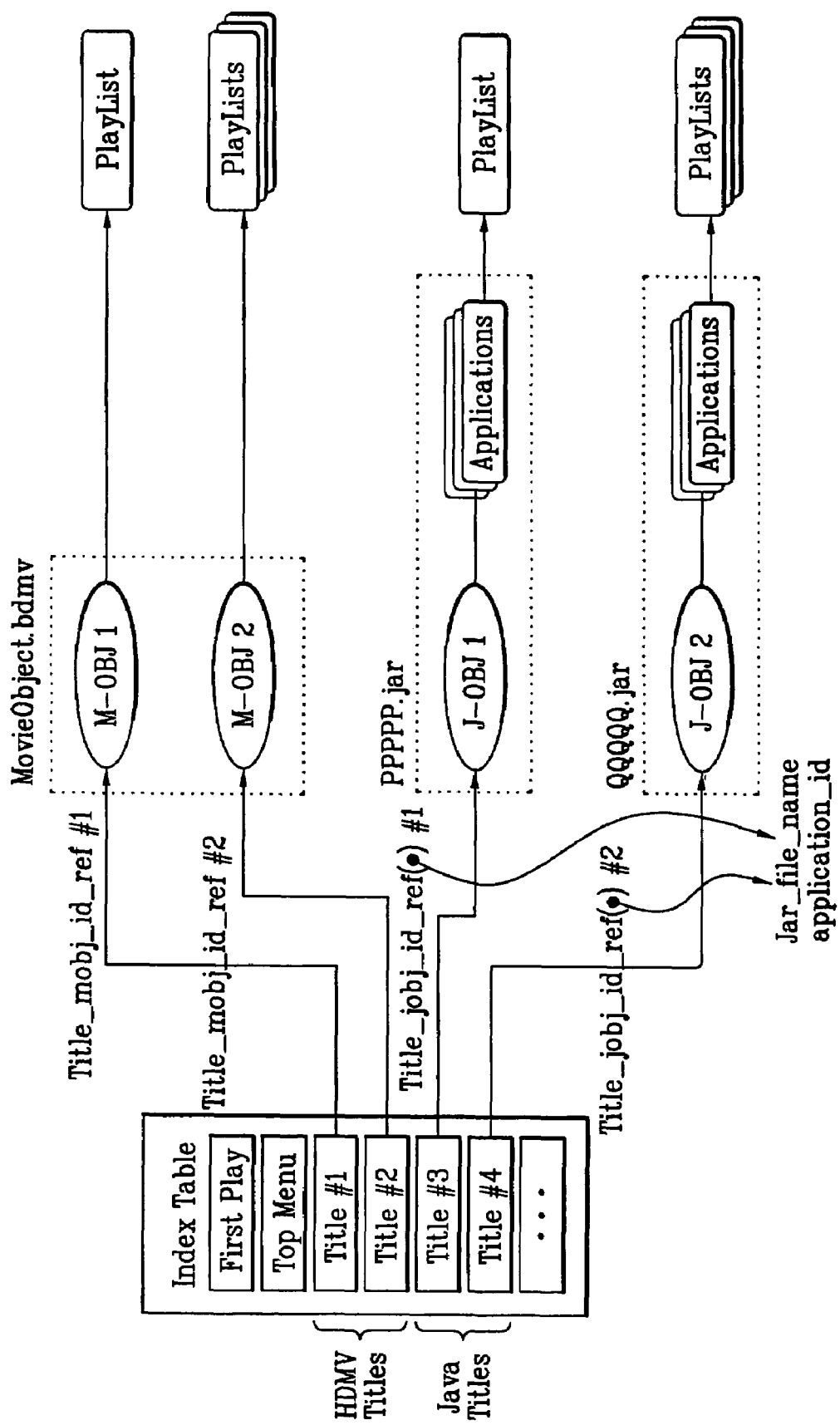
FIG. 4C illustrates a relationship for reproducing data using the file structure according to the first embodiment of the present invention.

FIGS. 4A and 4B illustrate a file structure recorded on the optical disc according to a first embodiment of the present invention. And, FIG. 4C illustrates a relationship for reproducing data using the file structure according to the first embodiment of the present invention. Referring to FIG. 4A, the basic configuration of the file structure is identical to the file structure shown in FIG. 2(a). Therefore, the structure of an object file managing the dynamic scenario will now be described in detail.

In the present invention, the Movie Object (M-OBJ) for reproducing the HDMV titles and the Java Object (J-OBJ) for reproducing the Java titles are formed to be independent from one another and, therefore, not to interfere with one another. In the first embodiment of the present invention, the "M-OBJs" are included in a single Movie Object file (MovieObject.bdmv), and the "J-OBJs" are included in each corresponding Java program file (*.jar). For example, J-OBJ 1 is included in PPPPP.jar, and J-OBJ 2 is included in QQQQQ.jar. Accordingly, FIG. 4B illustrates a plurality of J-OBJs being included in each Java program file (*.jar) within the file structure shown in FIG. 4A. For example, by including a plurality of J-OBJs (i.e., J-OBJ 1, J-OBJ 2, ... ) within the PPPPP.jar file, an optical disc using a wider range of reproduction scenarios may be designed and manufactured. However, in this case, a start object must be designated within the PPPPP.jar file. For example, the leading J-OBJ 1 may be used as the start object for executing the PPPPP.jar. The above-description may be identically applied to the QQQQQ.jar file.

FIG. 4C illustrates a relationship for reproducing a specific title in accordance with the file structure shown in FIG. 4A. Herein, it is assumed that Title #1 and Title #2 are HDMV titles and that Title #3 and Title #4 are Java titles. When an optical disc having the above-described structure is loaded in the optical recording and/or reproducing apparatus 10, and when an HDMV title (Title #1 or Title #2) is reproduced by a title reproduction selection, which is made by a user, or by a reproduction scenario recorded within the optical disc, the M-OBJ 1 and M-OBJ 2 that are respectively linked with Title #1 and Title #2 must first be executed. In order to do so, "Title_mobj_id_ref" information that executes the object being linked with the corresponding title must be recorded in the corresponding syntax. In the first embodiment according to the present invention, M-OBJ 1 and M-OBJ 2 are included in a single Movie Object file (MovieObject.bdmv).

On the other hand, when an optical disc having the above-described file structure is loaded in the optical recording and/or reproducing apparatus 10, and when an Java title (Title #3 or Title #4) is reproduced by a title reproduction selection, which is made by a user, or by a reproduction scenario recorded within the optical disc, the J-OBJ 1 and J-OBJ 2 that are respectively linked with Title #3 and Title #4 must first be executed. In order to do so, "Title_jobj_id_ref" information that executes the object being linked with the corresponding title must be recorded in the corresponding syntax. When reproduction is performed by using the file structure shown in FIG. 4A, J-OBJ 1 and J-OBJ 2 are included in each corresponding Java program file, PPPPP.jar and QQQQQ.jar. And so, the Title_jobj_id _ref( ) information must require information designating the Java program file including the corresponding J-OBJ (i.e., "Jar_file_name"). When the Java program file is configured with a plurality of applications, information designating a specific application (i.e., "application_id") may be additionally included in the Title_jobj_id_ref( ) information. Therefore, the command that finally reproduces the PlayList file is executed by the M-OBJ in case of the HDMV title, and executed by the J-OBJ in case of the Java title.

Figure 5A:
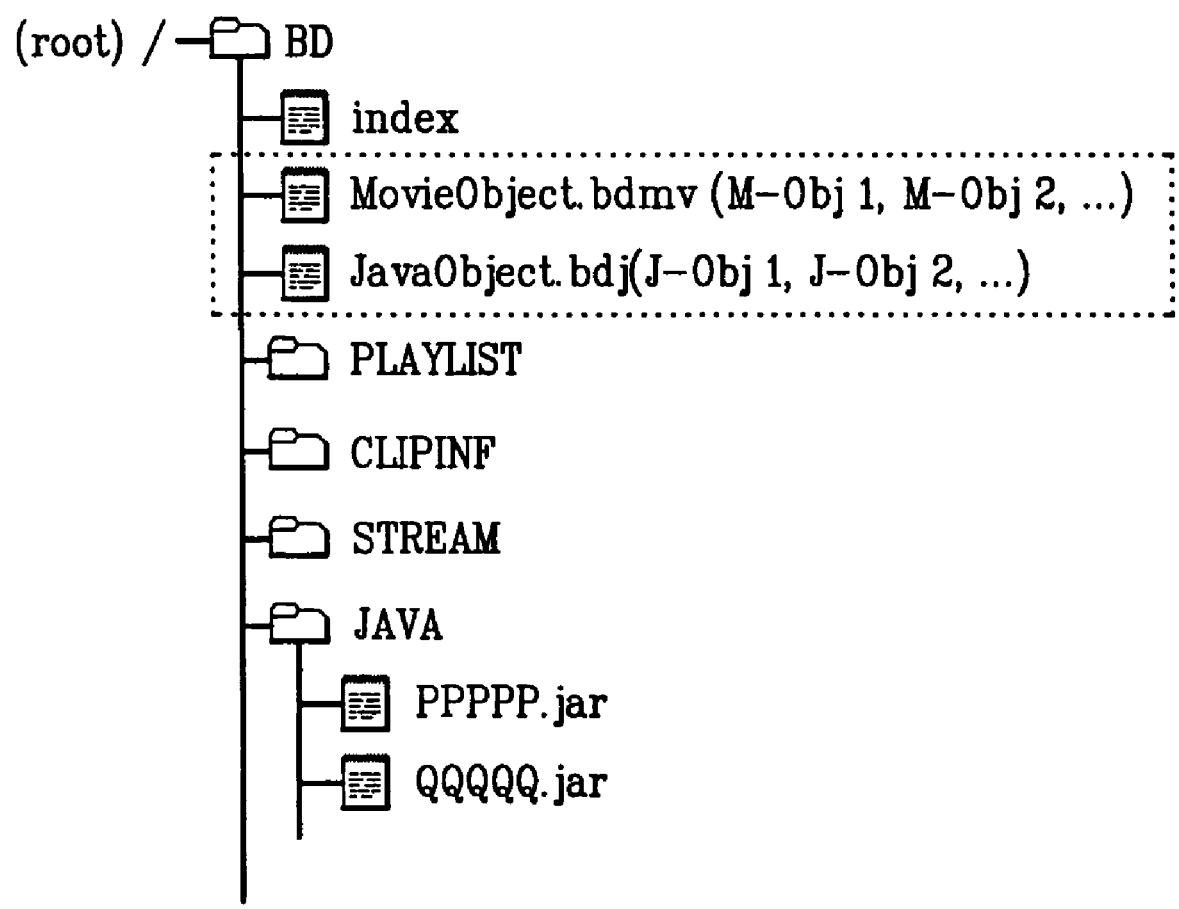
FIGS. 5A and 5B illustrate a file structure recorded on the optical disc according to a second embodiment of the present invention.
Figure 5B:
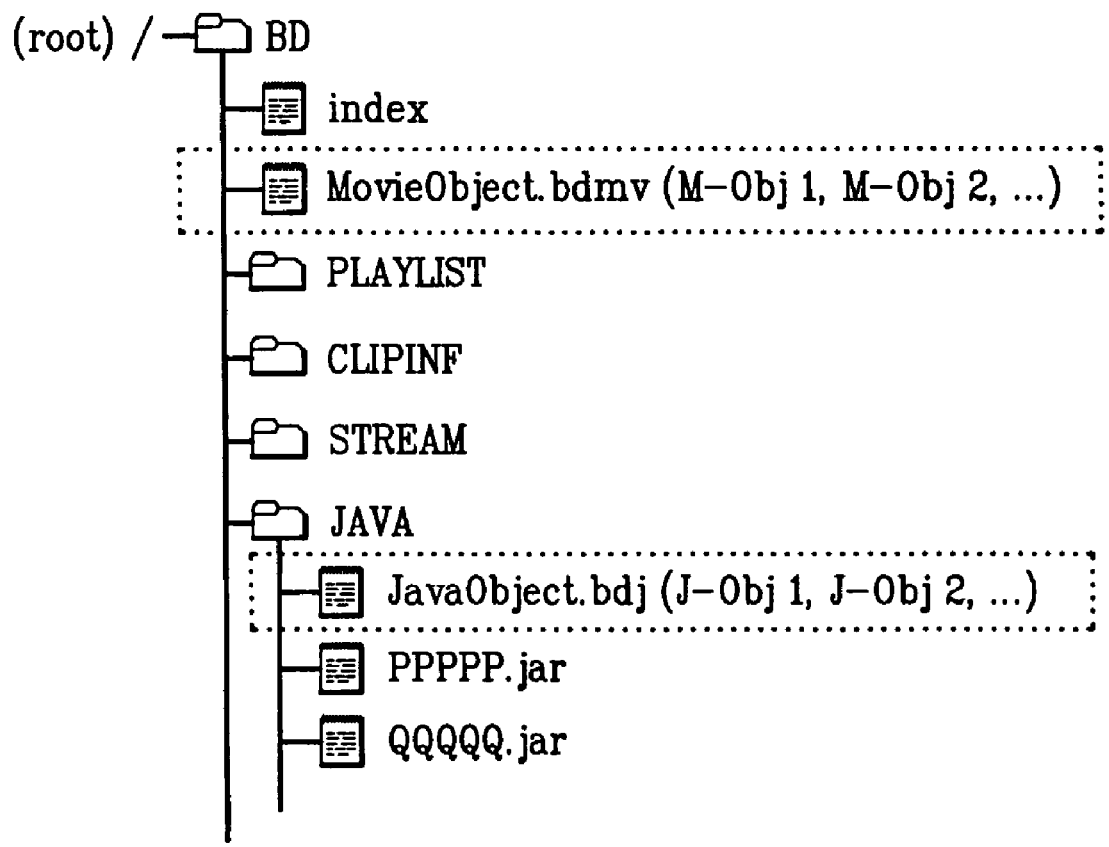
Figure 5C:
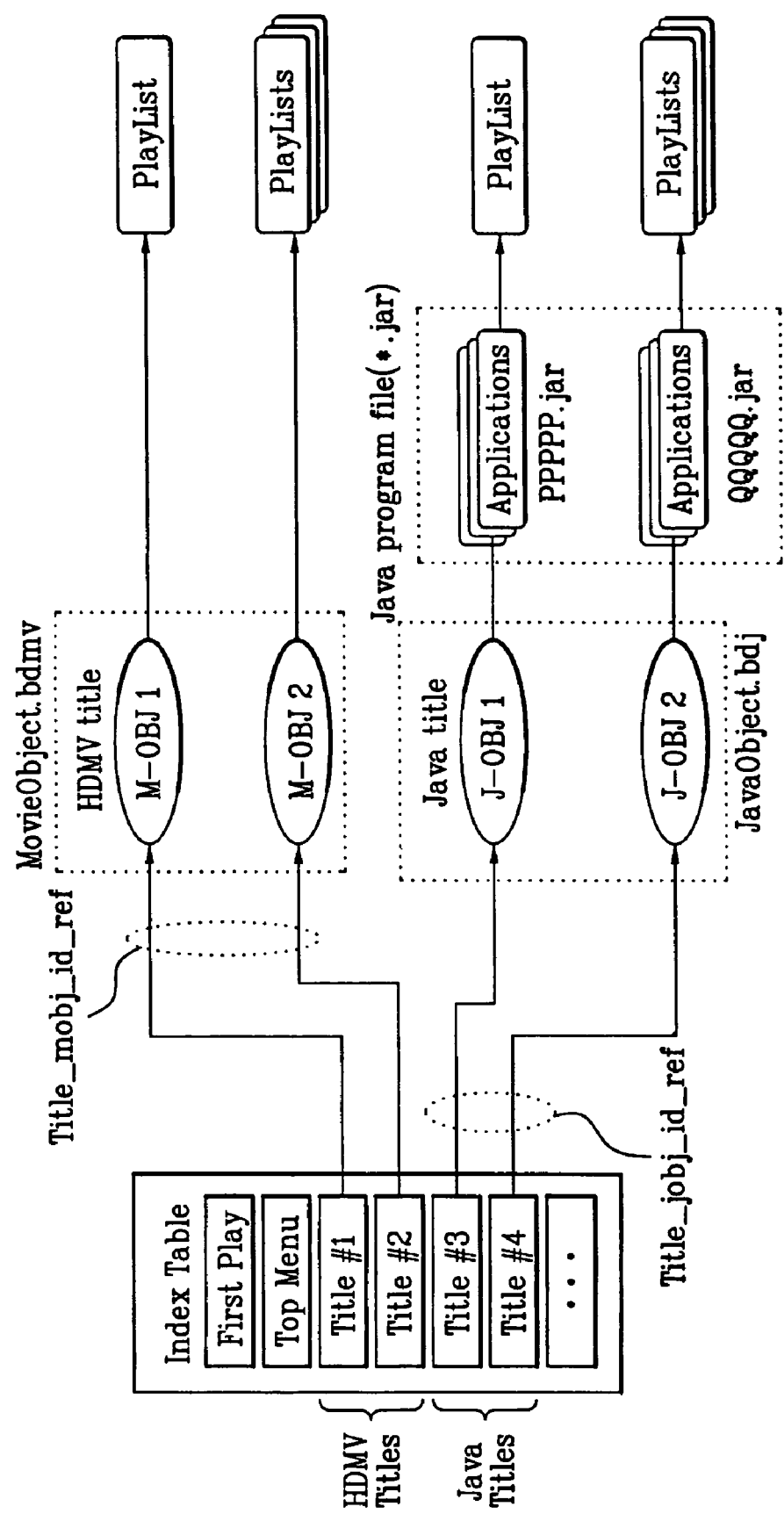
FIG. 5C illustrates a relationship for reproducing data using the file structure according to the second embodiment of the present invention.

FIGS. 5A and 5B illustrate a file structure recorded on the optical disc according to a second embodiment of the present invention. And, FIG. 5C illustrates a relationship for reproducing data using the file structure according to the second embodiment of the present invention. Referring to FIG. 5A, the basic configuration of the file structure is identical to the file structure shown in FIG. 2(a). Therefore, the structure of an object file managing the dynamic scenario will now be described in detail. More specifically, when compared with the file structure shown in FIG. 4A, in the file structure according to the second embodiment of the present invention, the objects for reproducing the Java titles (i.e., J-OBJ) and the objects for reproducing the HDMV titles (i.e., M-OBJ) are collectively recorded in a single object file (e.g., "JavaObject.bdj"). In other words, referring to FIG. 5A, the "JavaObject.bdj" file and the "MovieObject.bdmv" file are configured under the BD directory as general files. Alternatively, referring to FIG. 5B, the "MovieObject.bdmv" file is configured under the BD directory as a general file, and the "JavaObject.bdj" file is included in the Java directory (JAVA).

FIG. 5C illustrates a relationship for reproducing a specific title in accordance with the file structure shown in FIGS. 5A and 5B. Herein, it is assumed that Title #1 and Title #2 are HDMV titles and that Title #3 and Title #4 are Java titles. When an optical disc having the above-described structure is loaded in the optical recording and/or reproducing apparatus 10, and when an HDMV title (Title #1 or Title #2) is reproduced by a title reproduction selection, which is made by a user, or by a reproduction scenario recorded within the optical disc, the M-OBJ 1 and M-OBJ 2 that are respectively linked with Title #1 and Title #2 must first be executed. In order to do so, "Title_mobj_id_ref" information that executes the object being linked with the corresponding title must be recorded in the corresponding syntax.

On the other hand, when an optical disc having the above-described file structure is loaded in the optical recording and/or reproducing apparatus 10, and when an Java title (Title #3 or Title #4) is reproduced by a title reproduction selection, which is made by a user, or by a reproduction scenario recorded within the optical disc, the J-OBJ 1 and J-OBJ 2 that are respectively linked with Title #3 and Title #4 must first be executed. In order to do so, "Title_jobj_id_ref" information that executes the object being linked with the corresponding title must be recorded in the corresponding syntax. In the second embodiment according to the present invention, J-OBJ 1 and J-OBJ 2 are included in a single Java Object file (JavaObject.bdmv). More specifically, in case of the second embodiment of the present invention, a command that executes a specific Java program is recorded in the J-OBJ, and the Java program file (e.g., PPPPP.jar or QQQQQ.jar) designated by the J-OBJ is executed. Herein, the Java program file may be configured with a plurality of applications. And, a specific application may include a program that wishes reproduce (or playback) a specific PlayList file.

Figure 5D:
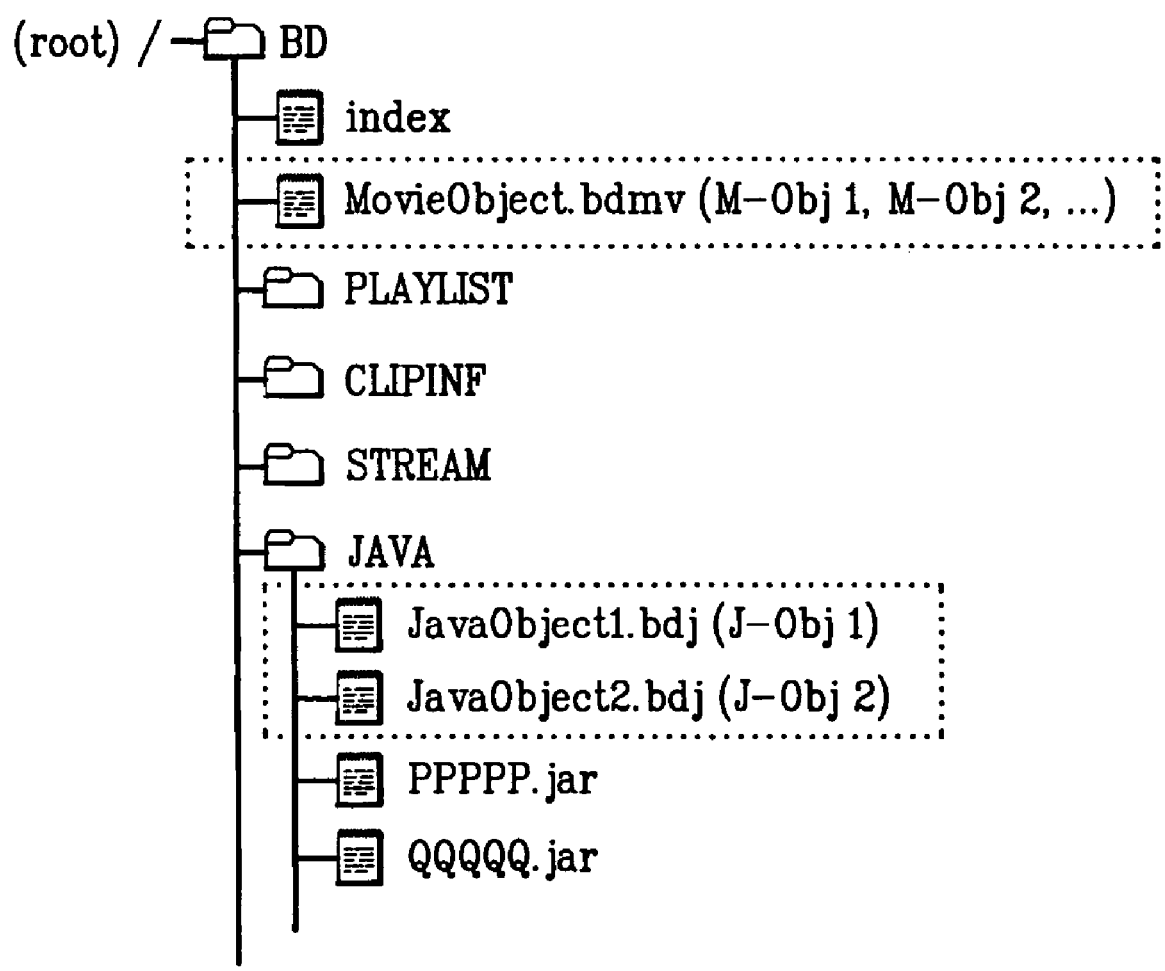
FIG. 5D illustrates a file structure recorded on the optical disc according to a third embodiment of the present invention.
Figure 5E:
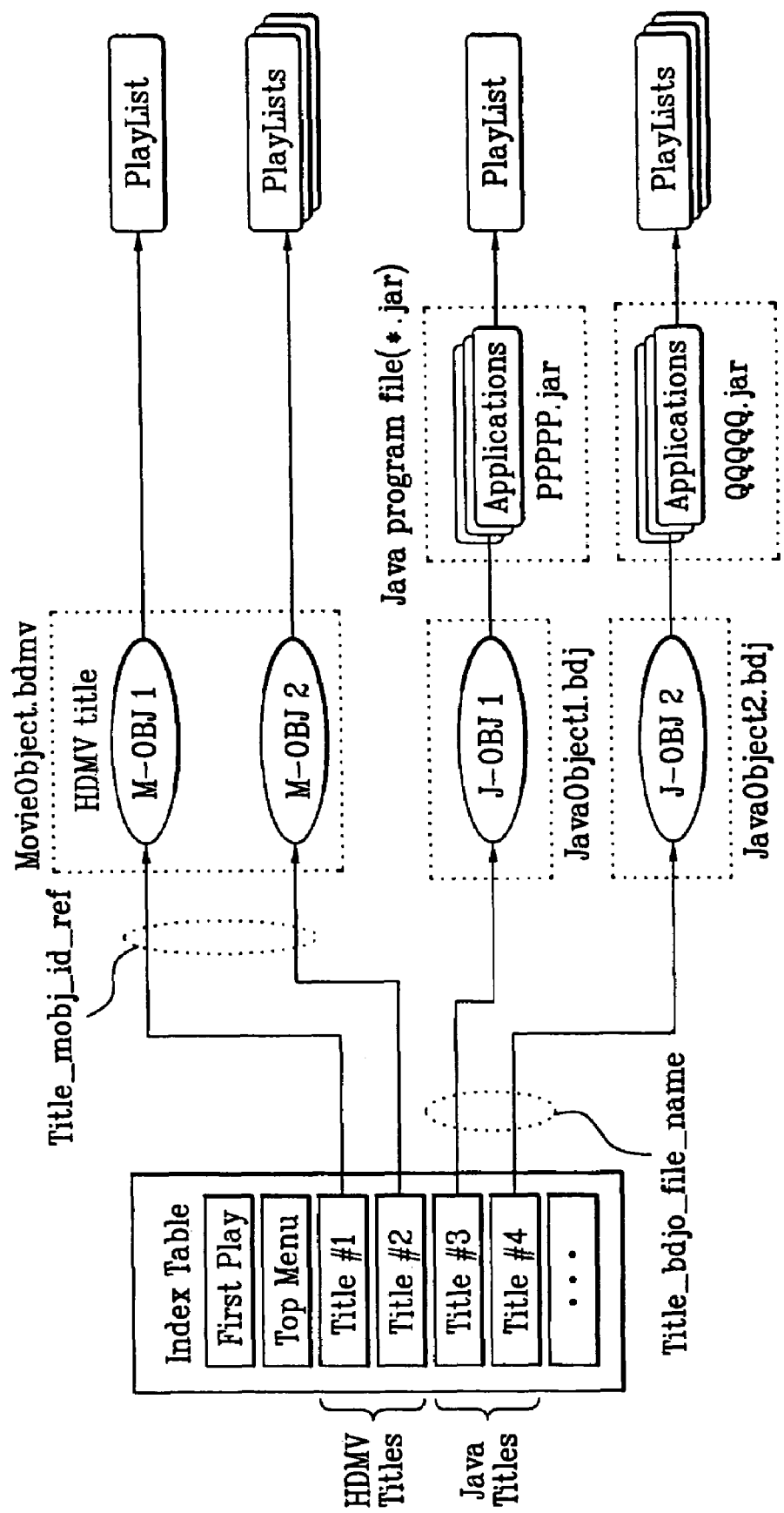
FIG. 5E illustrates a relationship for reproducing data using the file structure according to the third embodiment of the present invention.

FIG. 5D illustrates a file structure recorded on the optical disc according to a third embodiment of the present invention. And, FIG. 5E illustrates a relationship for reproducing data using the file structure according to the third embodiment of the present invention. Referring to FIG. 5D, the basic configuration of the file structure is identical to the file structure shown in FIG. 2(a). Therefore, the structure of an object file managing the dynamic scenario will now be described in detail. More specifically, when compared with the file structure shown in FIG. 5B, in the file structure according to the third embodiment of the present invention, a plurality of Java object files for reproducing the Java titles is configured for each of the Java objects (i.e., J-OBJ). For example, a "JavaObject1.bdj" file and a "JavaObject2.bdj" file may be configured in the file structure.

FIG. 5E illustrates a relationship for reproducing a specific title in accordance with the file structure shown in FIG. 5D. Herein, it is assumed that Title #1 and Title #2 are HDMV titles and that Title #3 and Title #4 are Java titles. When an optical disc having the above-described structure is loaded in the optical recording and/or reproducing apparatus 10, and when an HDMV title (Title #1 or Title #2) is reproduced by a title reproduction selection, which is made by a user, or by a reproduction scenario recorded within the optical disc, the M-OBJ 1 and M-OBJ 2 that are respectively linked with Title #1 and Title #2 must first be executed. In order to do so, "Title_mobj_id_ref" information that executes the object being linked with the corresponding title must be recorded in the corresponding syntax.

On the other hand, when an optical disc having the above-described file structure is loaded in the optical recording and/or reproducing apparatus 10, and when an Java title (Title #3 or Title #4) is reproduced by a title reproduction selection, which is made by a user, or by a reproduction scenario recorded within the optical disc, the J-OBJ 1 and J-OBJ 2 that are respectively linked with Title #3 and Title #4 must first be executed. In order to do so, "Title_bdjo_id_ref" information that executes the Java object file being linked with the corresponding title must be recorded in the corresponding syntax. In the third embodiment according to the present invention, J-OBJ 1 and J-OBJ 2 are included in each Java Object file (JavaObject1.bdj and Javaobject2.bdj), respectively. More specifically, in case of the third embodiment of the present invention, a command that executes a specific Java program is recorded in the J-OBJ, and the Java program file (e.g., PPPPP.jar or QQQQQ.jar) designated by the J-OBJ is executed. Herein, the Java program file may be configured with a plurality of applications. And, a specific application may include a program that wishes reproduce (or playback) a specific PlayList file.

Figure 6A:
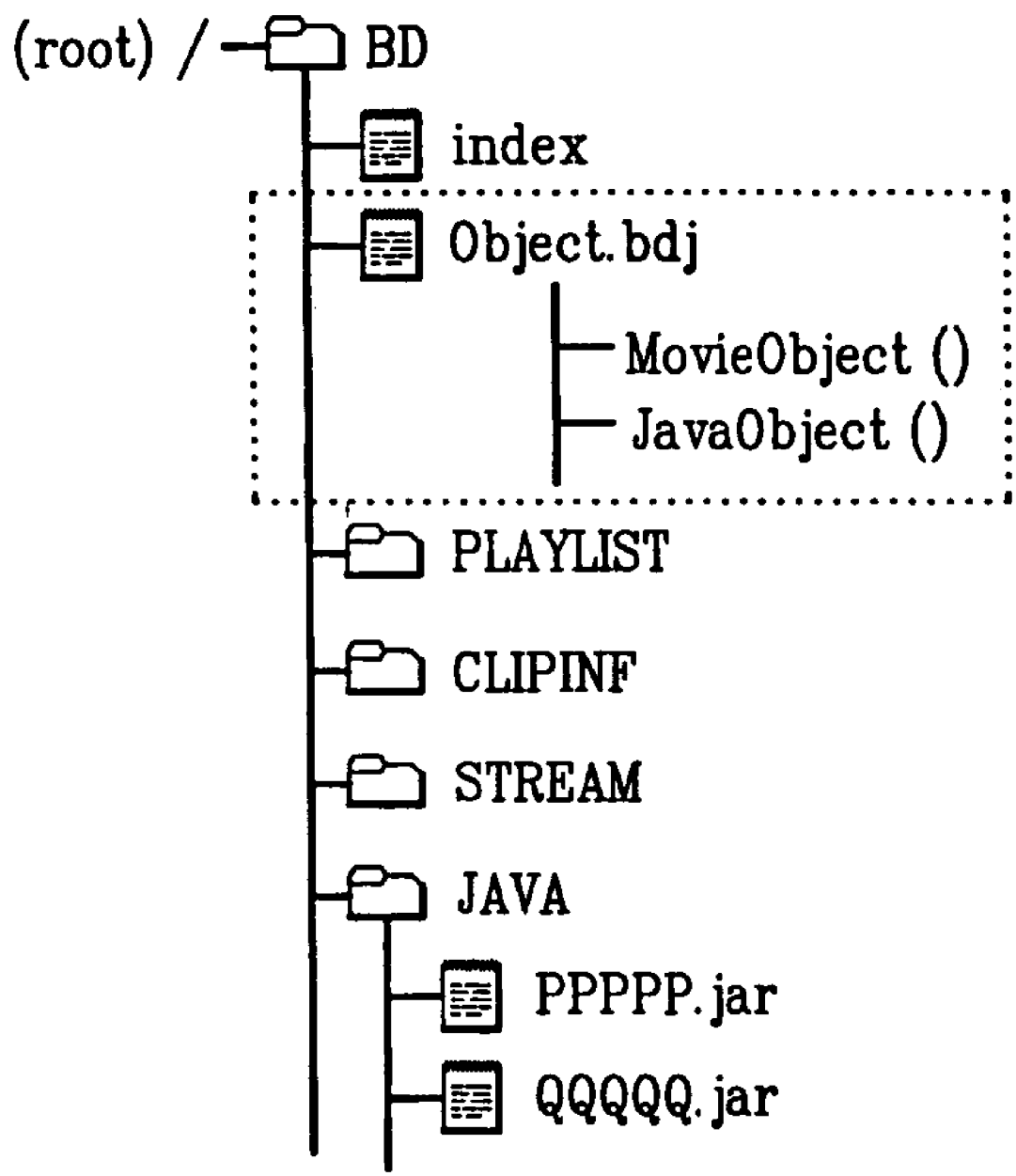
FIG. 6A illustrates a file structure recorded on the optical disc according to a fourth embodiment of the present invention.
Figure 6B:
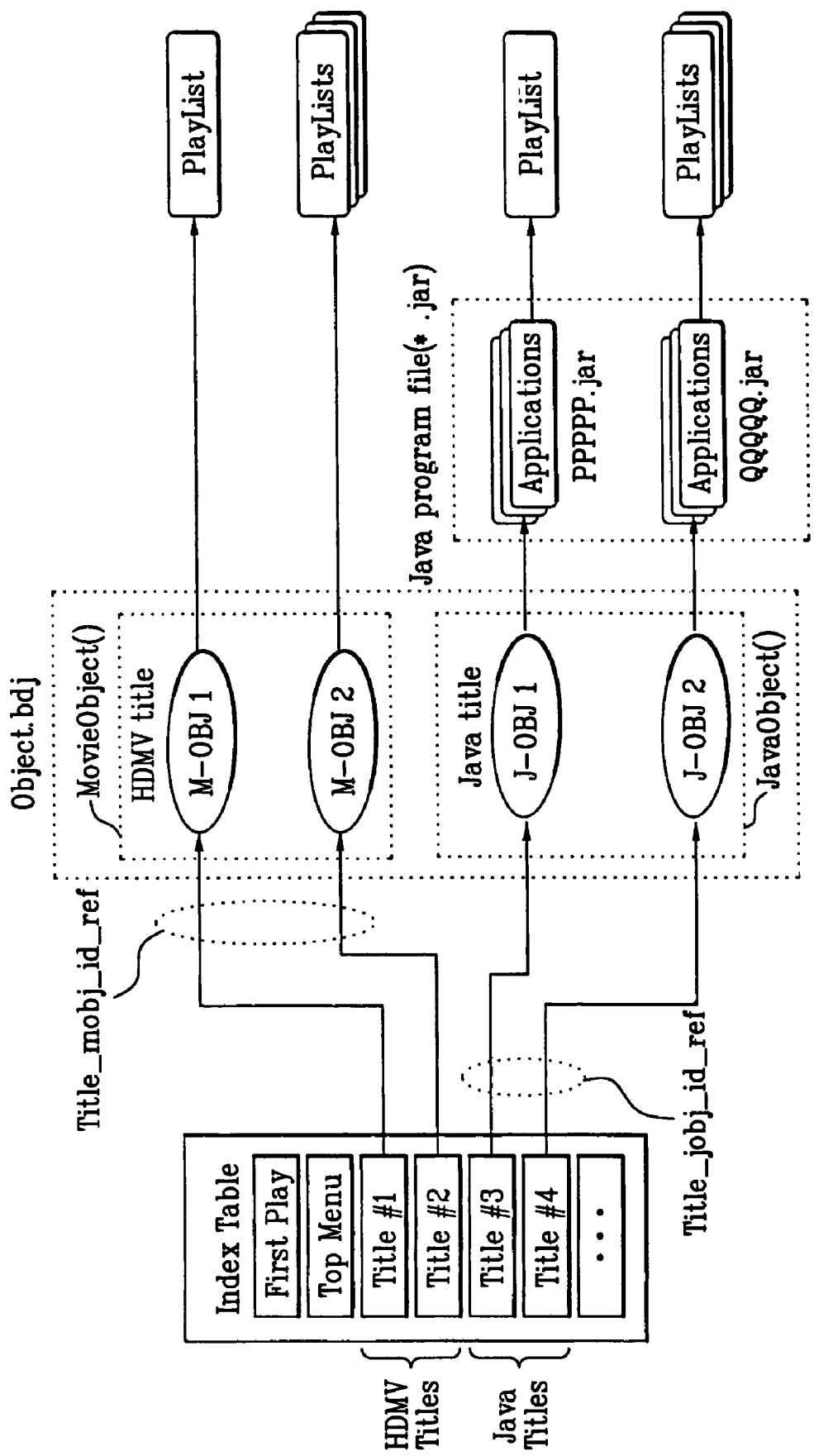
FIG. 6B illustrates a relationship for reproducing data using the file structure according to the fourth embodiment of the present invention.

FIG. 6A illustrates a file structure recorded on the optical disc according to a fourth embodiment of the present invention. And, FIG. 6B illustrates a relationship for reproducing data using the file structure according to the fourth embodiment of the present invention. Referring to FIG. 6A, the basic configuration of the file structure is identical to the file structure shown in FIG. 2(a). Therefore, the structure of an object file managing the dynamic scenario will now be described in detail. More specifically, in the file structure according to the fourth embodiment of the present invention (shown in FIG. 6A), the Java objects for reproducing the Java titles (i.e., J-OBJ) and the Movie objects for reproducing the HDMV titles (i.e., M-OBJ) are collectively recorded in a single object file (e.g., "Object.bdj"). In other words, referring to FIG. 6A, one of the object files (e.g., "Object.bdj") is configured under the BD directory as general files. The object file includes a "MovieObject( )" field and a "JavaObject( )" field. Herein, the "Movieobject( )" field includes Movie object (M-OBJ) information for reproducing the HDMV titles, and the "JavaObject( )" field includes Java object (J-OBJ) information for reproducing the Java titles.

FIG. 6B illustrates a relationship for reproducing a specific title in accordance with the file structure shown in FIG. 6A. Herein, it is assumed that Title #1 and Title #2 are HDMV titles and that Title #3 and Title #4 are Java titles. When an optical disc having the above-described structure is loaded in the optical recording and/or reproducing apparatus 10, and when an HDMV title (Title #1 or Title #2) is reproduced by a title reproduction selection, which is made by a user, or by a reproduction scenario recorded within the optical disc, the M-OBJ 1 and M-OBJ 2 that are respectively linked with Title #1 and Title #2 must first be executed. In order to do so, "Title_mobj_id_ref" information that executes the object being linked with the corresponding title must be recorded in the corresponding syntax. In the fourth embodiment of the present invention, the M-OBJ 1 and M-OBJ 2 are each defined in the "MovieObject( )" field within the "Object.bdj" file.

On the other hand, when an optical disc having the above-described file structure is loaded in the optical recording and/or reproducing apparatus 10, and when an Java title (Title #3 or Title #4) is reproduced by a title reproduction selection, which is made by a user, or by a reproduction scenario recorded within the optical disc, the J-OBJ 1 and J-OBJ 2 that are respectively linked with Title #3 and Title #4 must first be executed. In order to do so, "Title_jobj_id_ref" information that executes the object being linked with the corresponding title must be recorded in the corresponding syntax. In the fourth embodiment according to the present invention, J-OBJ 1 and J-OBJ 2 are each defined in the "JavaObject( )" field within the "Object.bdj" file. Furthermore, a command that executes a specific Java program (*.jar) is recorded in the J-OBJ, and the Java program file (e.g., PPPPP.jar or QQQQQ.jar) designated by the J-OBJ is executed. Herein, the Java program file may be configured with a plurality of applications.

Figure 7A:
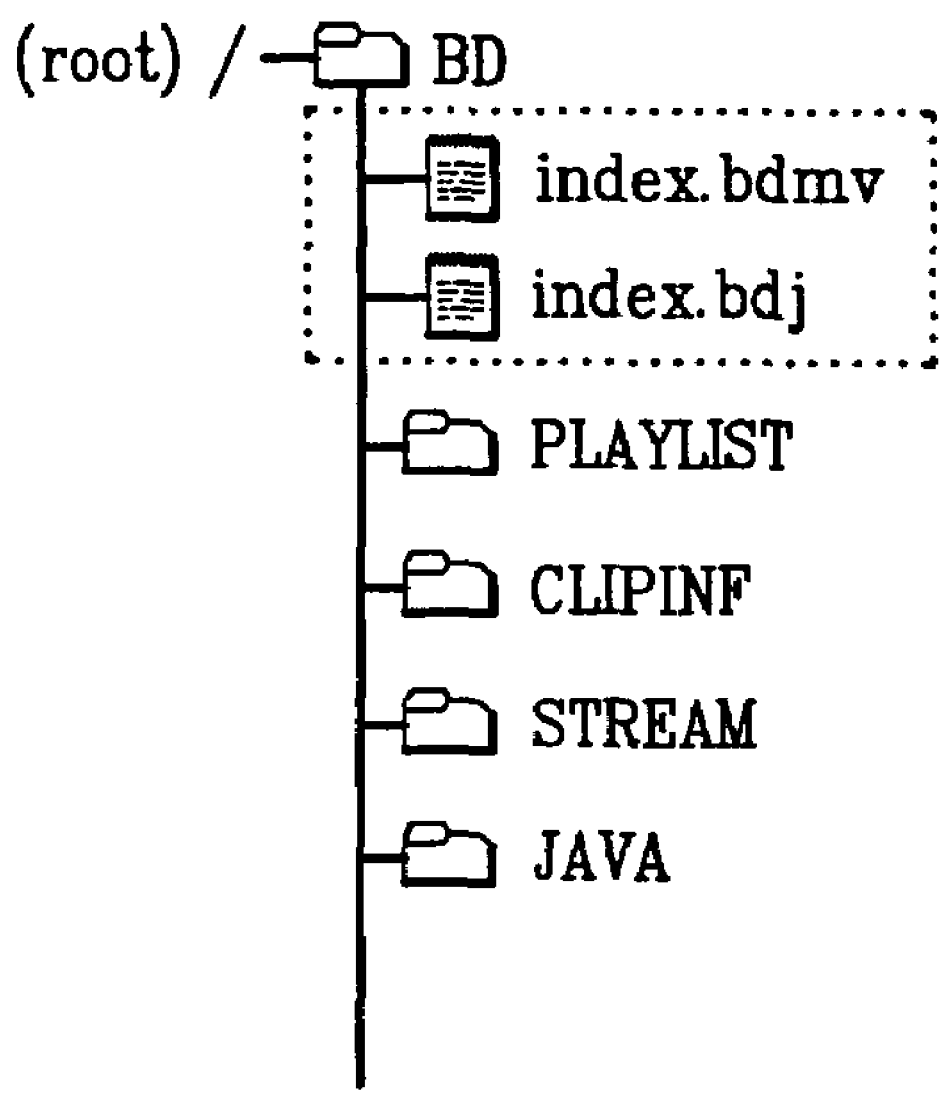
FIG. 7A illustrates a file structure recorded on the optical disc according to a fifth embodiment of the present invention.
Figure 7B:
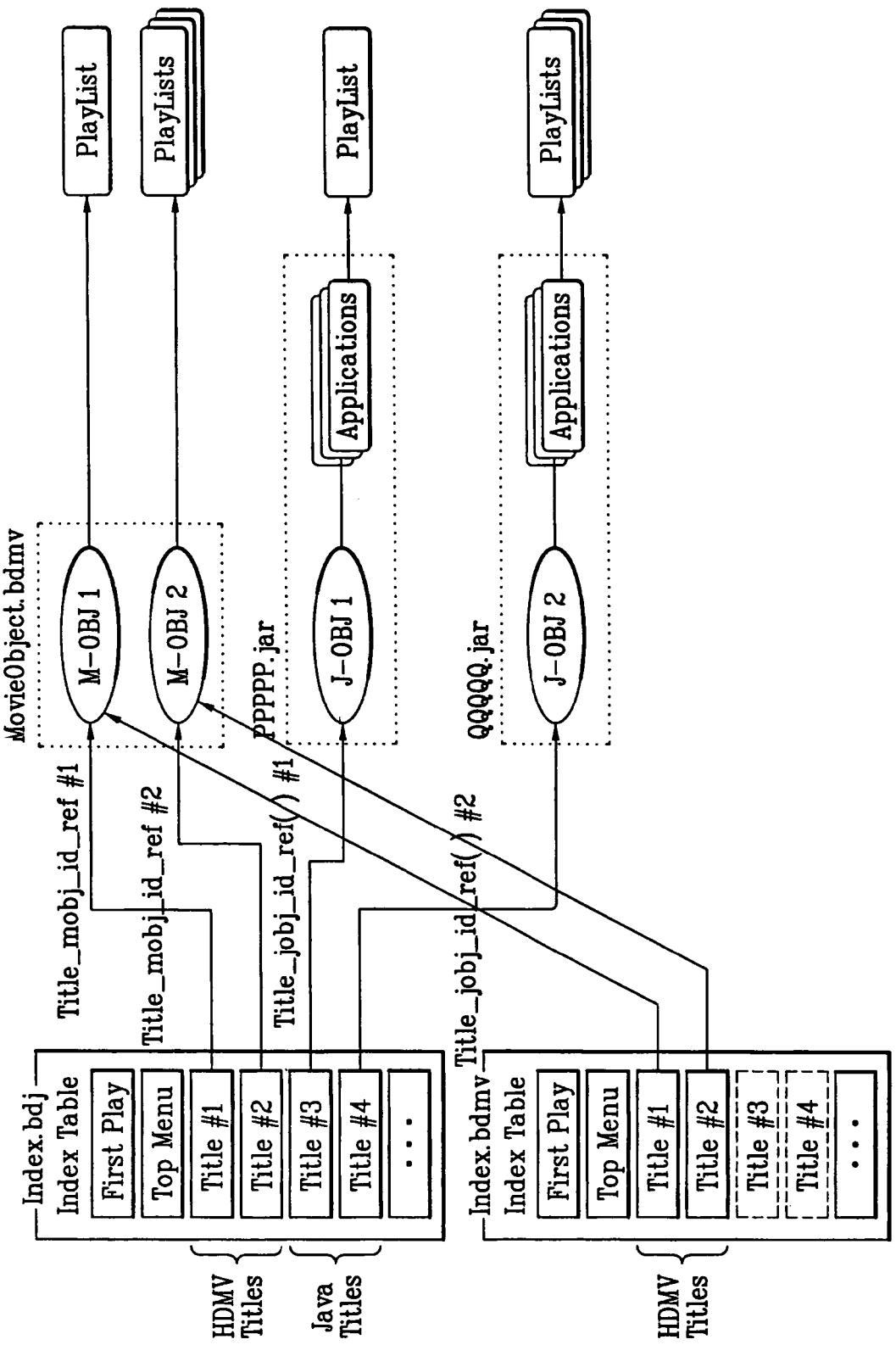
FIG. 7B illustrates a relationship for reproducing data using the file structure according to the fifth embodiment of the present invention.

FIG. 7A illustrates a file structure recorded on the optical disc according to a fifth embodiment of the present invention. And, FIG. 7B illustrates a relationship for reproducing data using the file structure according to the fifth embodiment of the present invention. Unlike the above-described embodiments, FIGS. 7A and 7B relate to the configuration of an index file. Therefore, the file structure according to the fifth embodiment of the present invention (shown in FIGS. 7A and 7B) may be applied to the file structures according to the above-described first to fourth embodiments of the present invention as well as other possible embodiments.

In this embodiment, when configuring an index file (index.xxxxx), a separate index file for an optical recording and/or reproducing apparatus that can only reproduce HDMV titles is additionally created (or configured). More specifically, an index file (i.e., index.bdj) including both HDMV titles and Java titles must be included in an optical disc having both HDMV titles and Java titles recorded therein. However, when using the optical recording and/or reproducing apparatus that can only reproduce HDMV titles, the Java titles and the Java program files (*.jar) cannot be executed. This may cause confusion or error in the index file (index.bdj) including all titles (i.e., both HDMV and Java titles). This is why a separate index file (index.bdmv) is created in advance for HDMV titles only during the manufacturing process of the optical disc so as to be provided to the user, in case the optical recording and/or reproducing apparatus reproducing only the HDMV titles is used during a future process.

FIG. 7A illustrates an example of two index files ("index.bdj" and "index.bdmv") that are independently created under the BD directory. FIG. 7B illustrates a relationship for reproducing a specific title in accordance with the file structure shown in FIG. 7A. Although the above-described embodiments shown in FIG. 4C, FIG. 5C, FIG. 5E, and FIG. 6B may all be applied to FIG. 7B, the structure (or configuration) shown in FIG. 4C will be given as an example for simplicity of the description. It is assumed that Title #1 and Title #2 are HDMV titles and that Title #3 and Title #4 are Java titles. Accordingly, the index file (index.bdmv) for HDMV titles only includes title information of Title #1 and Title #2 and does not include any information on Title #3 and Title #4, which correspond to the Java titles. Alternatively, in case of other embodiments, information on Title #3 and Title #4 may be included in the index file (index.bdmv) created for HDMV titles only. However, instead of recording the "Title_jobj_id_ref( )" field, which designates the Java objects (J-OBJ), "Title_mobj_id_ref" that designates a specific Movie object (M-OBJ) is recorded within the corresponding Title #3 and Title #4 information. Thus, the Java titles can be prevented from being executed by Titles #3 and #4.

Therefore, when the optical recording and/or reproducing apparatus 10 that reproduces the above-described optical disc consists of a system supporting the reproduction of all types of titles, among the plurality of index files, the apparatus refers to the index file (index.bdj), which supports all titles, so as to provide information on all of the titles to the user. Alternatively, when the optical recording and/or reproducing apparatus 10 consists of a system supporting the reproduction of HDMV titles only, among the plurality of index files, the apparatus refers to the index file (index.bdmv) that only supports the HDMV titles, so as to provide information on only the HDMV titles to the user.

Figure 8A:
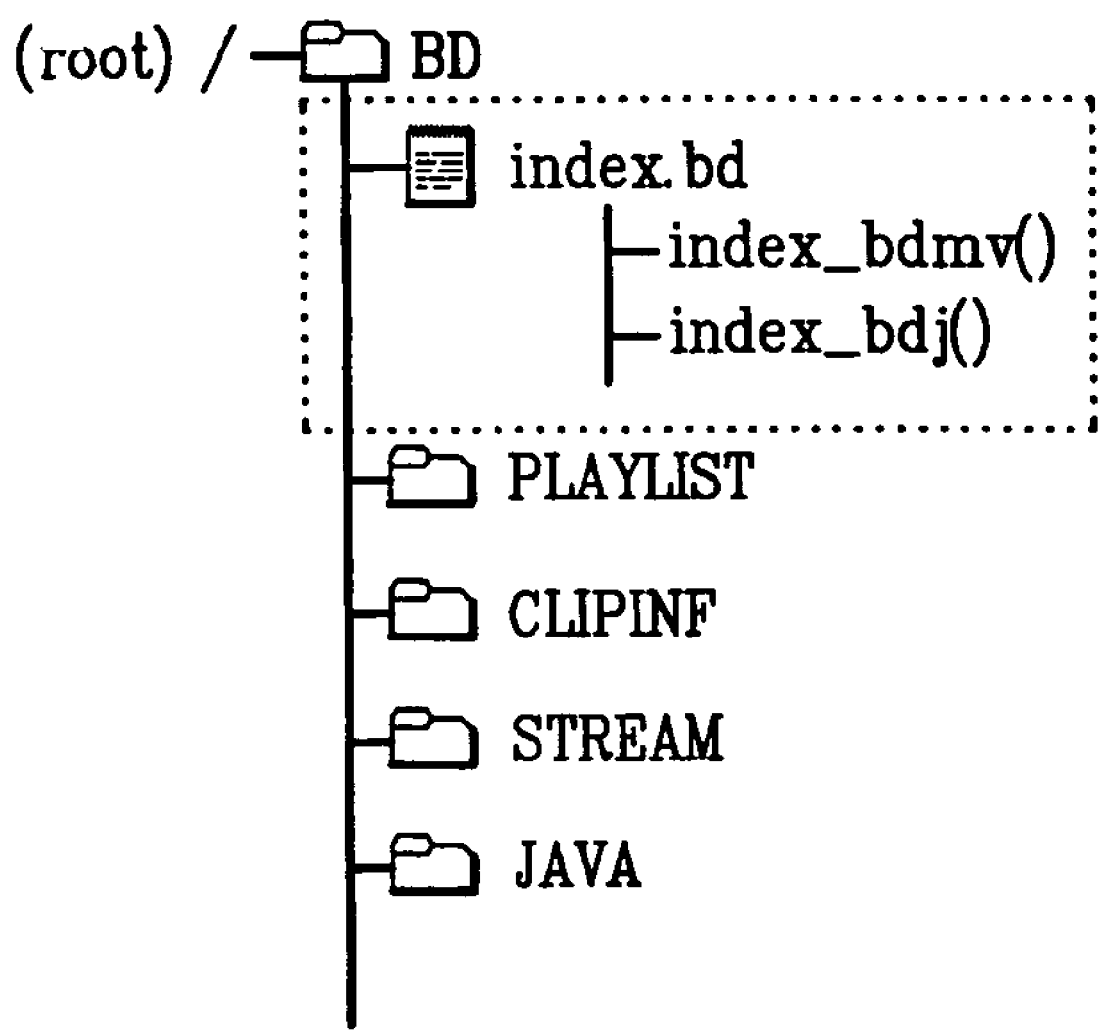
FIG. 8A illustrates a file structure recorded on the optical disc according to a sixth embodiment of the present invention.
Figure 8B:
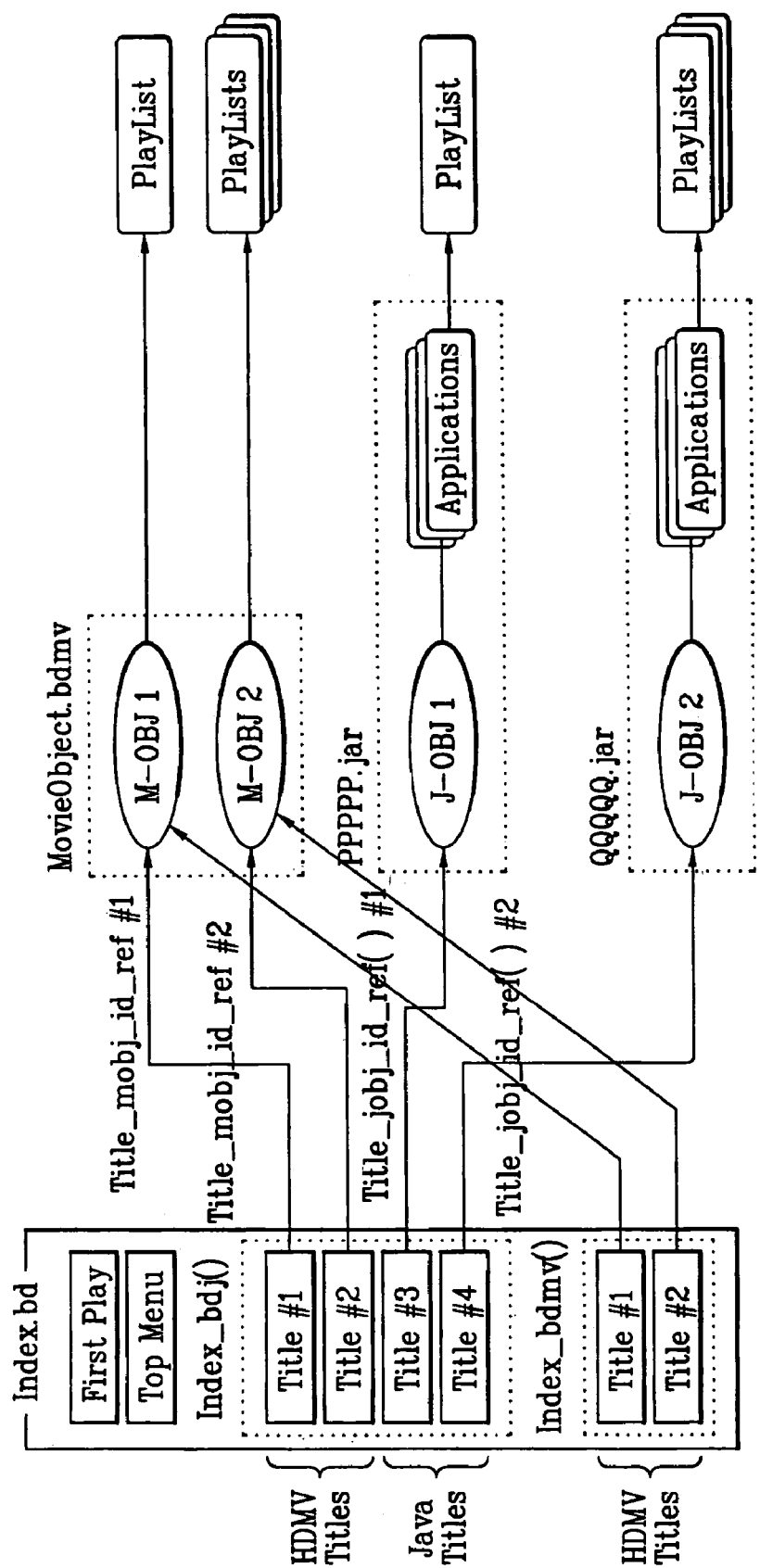
FIG. 8B illustrates a relationship for reproducing data using the file structure according to the sixth embodiment of the present invention.

FIG. 8A illustrates a file structure recorded on the optical disc according to a sixth embodiment of the present invention. And, FIG. 8B illustrates a relationship for reproducing data using the file structure according to the sixth embodiment of the present invention. Unlike the embodiment shown in FIG. 7A, when configuring an index file (index.xxxxx), an "index_bdj( )" field including index information on all titles and an "index_bdmv( )" field including index information on the HDMV titles are independently configured on a single index file (which is referred to as an "index.bd" file). FIG. 8B illustrates a relationship for reproducing a specific title in accordance with the file structure shown in FIG. 8A. Although the above-described embodiments shown in FIG. 4C, FIG. 5C, FIG. 5E, and FIG. 6B may all be applied to FIG. 8B, the structure (or configuration) shown in FIG. 4C will be given as an example for simplicity of the description.

It is assumed that Title #1 and Title #2 are HDMV titles and that Title #3 and Title #4 are Java titles. Herein, a single index file (index.bd) includes an "index_bdj( )" field including information on all titles (Title #1 to Title #4), and an "index_bdmv( )" field including information on Title #1 and Title #2 (both HDMV titles). Therefore, when the optical recording and/or reproducing apparatus 10 that reproduces the above-described optical disc consists of a system supporting the reproduction of all types of titles, the apparatus refers to the "index_bdj( )" field within the index file (index.bd), so as to provide information on all of the titles to the user. Alternatively, when the optical recording and/or reproducing apparatus 10 consists of a system supporting the reproduction of HDMV titles only, the apparatus refers to the "index_bdmv( )" field within the index file (index.bd), so as to provide information on only the HDMV titles to the user. In case of other embodiments, information on Title #3 and Title #4 may be included in the index file (index.bdmv) created for HDMV titles only. However, instead of recording the "Title_jobj_id_ref( )" field, which designates the Java objects (J-OBJ), "Title_mobj_id_ref" that designates a specific Movie object (M-OBJ) is recorded within the corresponding Title #3 and Title #4 information. Thus, the Java titles can be prevented from being executed by Titles #3 and #4.

In all of the above-described embodiments (shown in FIG. 4A to FIG. 8B), the "First Play" field corresponds to information designating a first screen that is forcibly reproduced (or displayed) after the corresponding optical disc is loaded in the apparatus 10. The "Top Menu" field is information designating a screen (or title) that configures the main screen of the corresponding optical disc. Herein, the "First Play" field and the "Top Menu" field also include information designating any one of the M-OBJ and the J-OBJ as its specific object. However, it is preferable that the "First Play" field and the "Top Menu" field within the index.bdmv file of FIG. 7B or the index.bd file of FIG. 8B includes information designating only the Movie Object (M-OBJ). This is because the index files (index.bdmv and index.bd) have been created in consideration of the optical recording and/or reproducing apparatus 10 that reproduces only the HDMV titles.

Figure 9A:
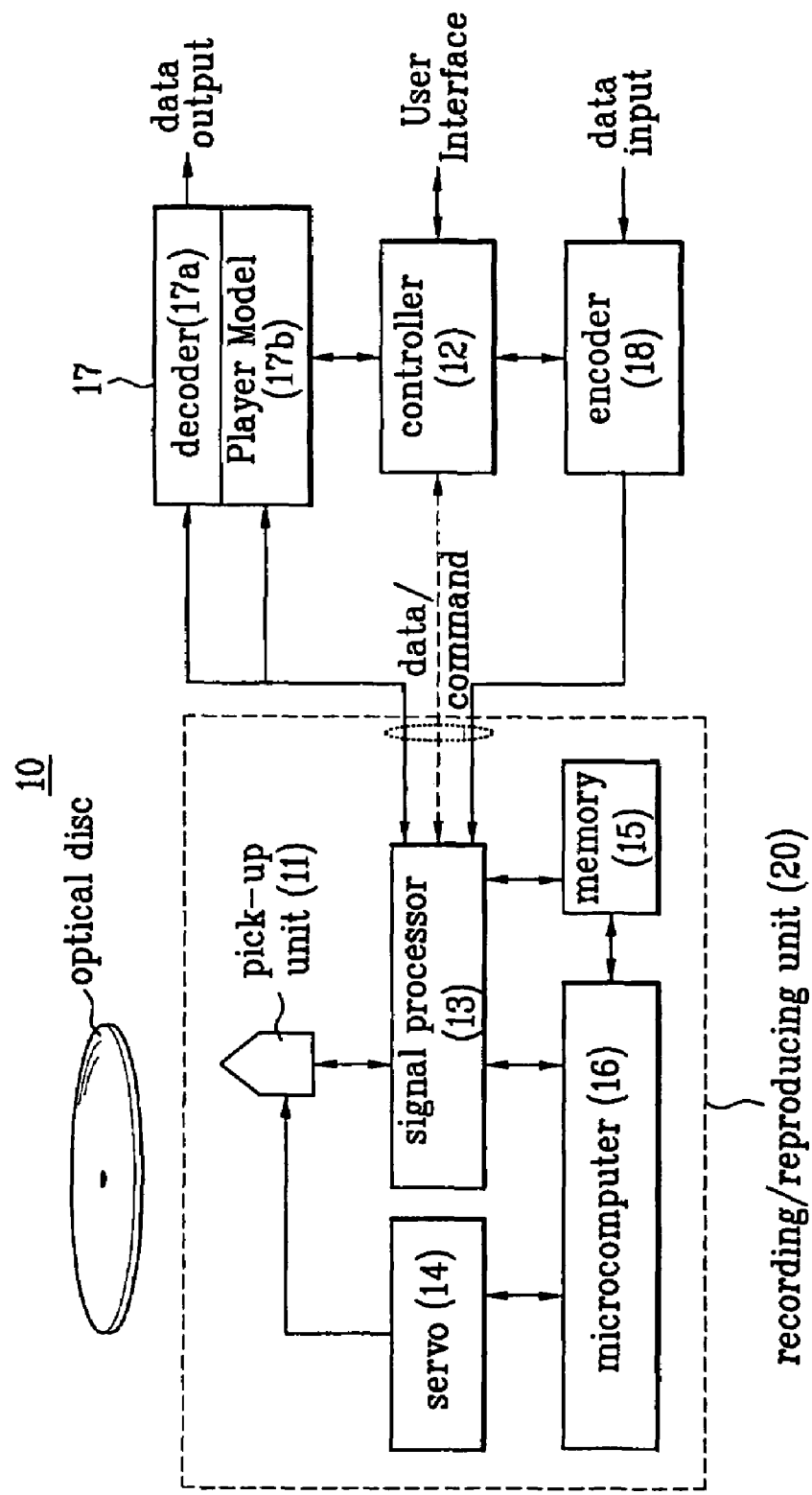
FIG. 9A illustrates an overall optical recording and/or reproducing apparatus according to the present invention.
Figure 9B:
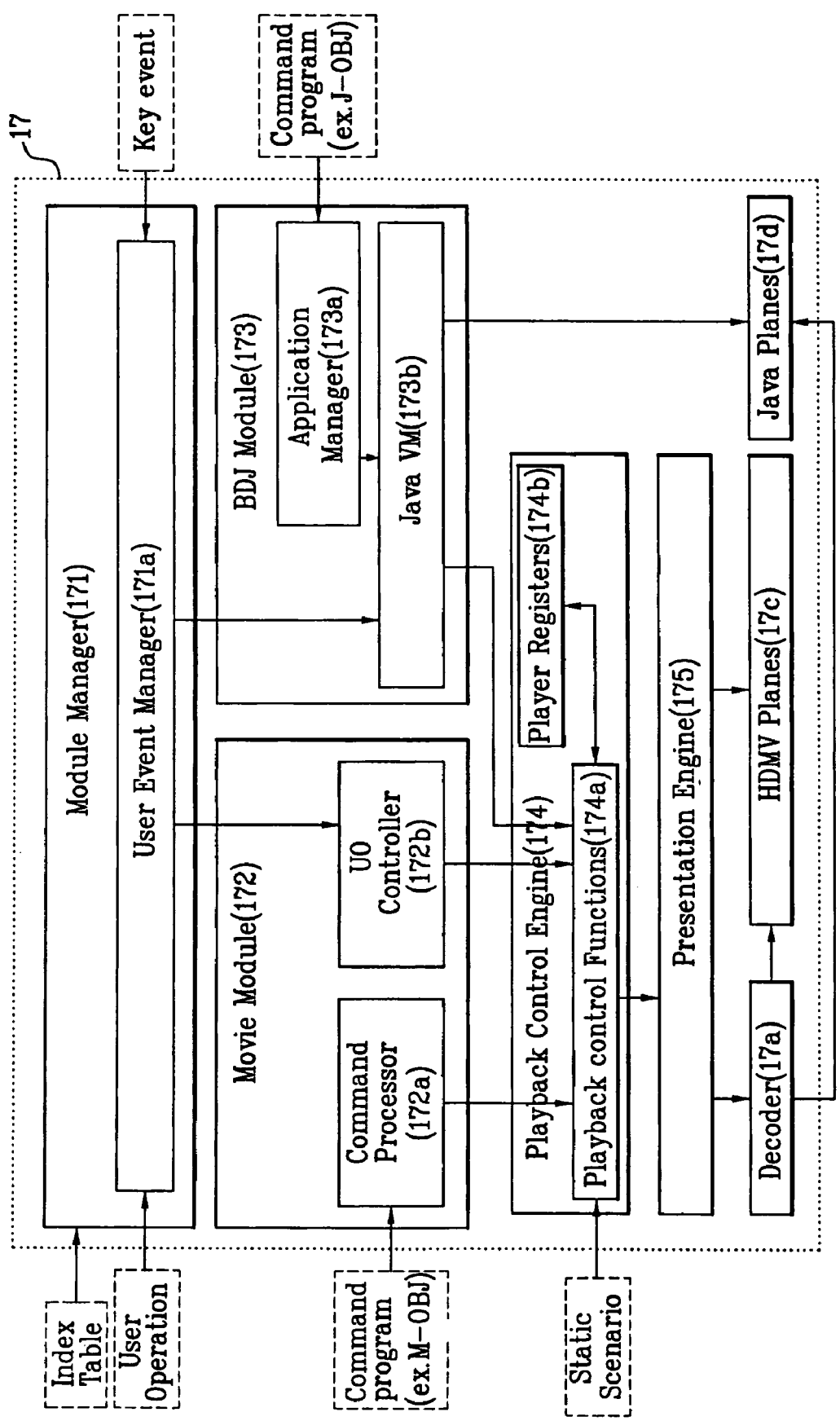
FIG. 9B illustrates a player model according to the present invention.

FIGS. 9A and 9B illustrate an example of the optical recording and/or reproducing apparatus according to the present invention. More specifically, FIG. 9A illustrates the overall structure of the optical recording and/or reproducing apparatus 10. And, FIG. 9B illustrates a detailed structure of a player model according to the present invention, which is for reproducing an optical disc having titles of different attributes recorded therein. Referring to FIG. 9A, the optical recording and/or reproducing apparatus 10 according to the present invention will now be described in detail.

The optical recording and/or reproducing apparatus 10 includes a pick-up unit 11 for reproducing the management information including the data recorded in a title recording area and file information recorded in a management area, a servo 14 controlling the operations of the pick-up unit 11, a signal processor 13 either recovering the reproduction (or playback) signal received from the pick-up unit 11 to a desired signal value, or modulating a signal to be recorded to an optical disc recordable signal and transmitting the modulated signal, a memory 15 recording diverse necessary information required for reproducing the optical disc, and a microcomputer 16 controlling the above operations. The above-described structure may be collectively referred to as a recording/reproducing unit 20. A controller 12 controls all of the components included in the entire structure. More specifically, the controller 12 receives reproduction (or playback) commands of a specific title through an interface with the user. A reproduction processing means 17 performs a final decoding of an output data in accordance with the control of the controller 12 and provides the decoded data to the user.

More specifically, the reproduction processing means 17 includes a decoder 17a and a player model 17b. The decoder 17a decodes the AV signal, and the player model 17b interprets the object information associated with the reproduction of the specific titles and the user command received through the controller 12. Then, the player model 17b performs reproduction in accordance with the interpreted information and command. However, depending upon the embodiment, the player model 17b may also include the decoder 17a. In this case, the reproduction processing means 17 according to the present invention may function as the player model (shown in FIG. 9B). Moreover, in order to record a signal within the optical disc, an AV encoder 18 converts an input signal to a specific format signal (e.g., an MPEG2 transport stream) according to the control of the controller 12 and provides the converted signal to the signal processor 13.

FIG. 9B illustrates a detailed structure of the player model, which includes a module manager 171, a movie module 172, a BDJ module 173, a playback control engine 174, and a presentation engine 175. Herein, the movie module 172 and the BDJ module 173 are formed independently as separate means for managing reproduction processing in order to reproduce HDMV and Java titles. More specifically, the movie module 172 reproduces the HDMV titles, and the BDJ module 173 reproduces the Java titles. Both the movie module 172 and the BDJ module 173 have control functions that can receive and process the above-described objects (M-OBJ or J-OBJ), which are received in the form a command or a program. As a means for receiving and processing the object information, a command processor 172a is included in the movie module 172, and an application manager 173a and a Java VM 173b are included in the BDJ module 173. Additionally, the module manager 171 not only transmits the user command to the movie module 172 and the BDJ module 173 but also controls the operation of the movie module 172 and the BDJ module 173.

The playback control engine 174 interprets the contents of a PlayList file, which is recorded within the optical disc, in accordance with the reproduction (or playback) command of the movie module 172 and the BDJ module 173, and performs reproduction accordingly. (Herein, the contents of the PlayList file particularly configure the static scenario.) Furthermore, the presentation engine 175 displays the specific stream onto the screen. Herein, the reproduction of the specific stream is managed by the playback control engine 174. Most particularly, the playback control engine 174 consists of a playback control function 174a and player register 174b, wherein the playback control function 174a actually manages all reproduction, and wherein the player registers 174b store (or register) a reproduction environment or reproduction status (or condition) of the player. In some cases, the playback control function 174a may function and be referred to as the playback control engine 174. The player registers 174b consist of a plurality of player status registers (PSR) and a plurality of general purpose registers (GPR).

In the player model (shown in FIG. 9B) according to the present invention, the module manager 171, the movie module 172, the BDJ module 173, and the playback control engine 174 may be processed by software. Herein, it is actually more advantageous to process the above elements by software rather than hardware. On the other hand, the presentation engine 175, the decoder 17a, and graphic planes 17c and 17d are generally designed as hardware. Most particularly, the elements that may be processed as software (e.g., reference numerals 171, 172, 173, and 174) may also be configured as part of the above-described controller 12. Therefore, it is apparent that each element of the structure of the present invention should be viewed and understood as part of the structure itself and should not be limited to whether each of the elements is formed as a software or hardware.

The player model (shown in FIG. 9B) has the following characteristics. First of all, as described above, each of the movie module 172 reproducing the HDMV titles and the BDJ module 173 reproducing the Java titles is formed independently. Herein, the two modules (172 and 173) are not operated at the same time. In other words, the Java title cannot be reproduced while the HDMV title is being reproduced. And, the HDMV title cannot be reproduced while the Java title is being reproduced.

In addition, each of the HDMV titles and Java titles receives a user command by a different method, and their methods of executing the received user command are also independent from one another. In this case, however, a means for receiving the user command and transmitting the received command to one of the movie module 172 and the BDJ module 173. In the present invention, a user event manager 171a included in the module manager 171 performs such function. For example, when the received user command is a command made by a user operation (UO), the user event manager 171a transmits the received command to a UO controller 172b included in the movie module 172 so that the user command can be executed. And, when the received user command is a command made by a key event, the user event manager 171a transmits the received command to a Java VM 173b included in the BDJ module 173 so that the user command can be executed.

Furthermore, any one of the modules (172 or 173) that is currently being operated manages (or masters) the playback control engine 174. More specifically, the movie module 172 is mastered while the HDMV title is being reproduced, and the BDJ module 173 is mastered while the Java title is being reproduced. Finally, the graphic plane is also managed independently. For example, the operation of an HDMV plane 17c is mastered by the presentation engine 175, and the operation of a Java plane 17d is mastered by the Java VM 173b included in the BDJ module 173.

A method for reproducing the optical disc by using the optical recording and/or reproducing apparatus according to the present invention will now be described in detail. More specifically, when the optical disc having the above-described reproduction management file structure recorded therein in accordance with any one of the above-described embodiments (shown in FIG. 4A to FIG. 8B) is loaded in the optical recording and/or reproducing apparatus 10, the microcomputer 16 reads the file information recorded within the optical disc by using the pick-up unit 11. Then, the microcomputer 16 stores the read information within the memory 15. Subsequently, after a user-selection command for reproducing a specific title is inputted by using the controller 12, the microcomputer 16 reads a specific set of data in accordance with a reproduction scenario corresponding to the selected title. Then, the microcomputer 16 transmits the read data to the player model (shown in FIG. 9B). Thereafter, in accordance with the reproduction scenario verified by the attribute of the corresponding title and by each object file and PlayList file, the player model (shown in FIG. 9B) operates one of the movie module 172 and the BDJ module 173, so as to perform a final reproduction of the title selected by the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium storing a data structure for managing reproduction of titles having different data formats by a reproducing apparatus comprising:
   a data area including at least a movie title and a Java title; and
   a data management area including a plurality of data management files for managing reproduction of at least the movie title and the Java title by a reproducing apparatus, wherein the data management files include a first object file containing first management information for managing reproduction of the movie title by the reproducing apparatus, and a second object file including second management information for managing reproduction of the Java title by the reproducing apparatus.

2. The recording medium of claim 1, wherein the first object file is a movie object file for managing reproduction of the movie title.

3. The recording medium of claim 2, wherein the movie object file contains a plurality of movie objects.

4. The recording medium of claim 1, wherein the second object file includes a plurality of Java object files for managing reproduction of the Java title.

5. The recording medium of claim 4, wherein each of the plurality of Java object files includes management information associated with reproduction of a particular Java title.

6. The recording medium of claim 5, wherein the management information included in each of the plurality of Java object files designates at least one Java program file associated with the reproduction of the particular Java title.

7. The recording medium of claim 1, wherein the second object file includes a Java object file for managing reproduction of the Java title.

8. The recording medium of claim 7, wherein the Java object file includes a plurality of Java objects.

9. The recording medium of claim 1, wherein the data management files further include at least one index file having index information of at least the movie title and the Java title.

10. The recording medium of claim 1, wherein the data management files further include a single index file having index information of at least the movie title and the Java title.

11. The recording medium of claim 1, wherein the data management files further include a first index file having index information of the movie title, and a second index file having index information of the Java title.

12. The recording medium of claim 1, wherein the data management files further include a first index file having index information of the movie title, and a second index file having index information of the movie title and the Java title.

13. A recording medium storing a data structure for managing reproduction of titles having different data formats by a reproducing apparatus comprising:
   a data area including a movie title and a Java title; and
   a data management area including a movie object file having management information for reproduction of the movie title by the reproducing apparatus, at least one Java object file having management information for managing reproduction of the Java title by the reproducing apparatus, and an index file having index information of the movie title and the Java title for providing information to the reproducing apparatus.

14. A recording medium storing a data structure for managing reproduction of titles having different data formats by a reproducing apparatus comprising:
   a data area including a movie title and a Java title; and
   a data management area including a movie object file having management information for managing reproduction of the movie title by the reproducing apparatus, at least one Java object file having management information for managing reproduction of the Java title by the reproducing apparatus, a first index file having index information of the movie title for providing information to the reproducing apparatus, and a second index file having index information of the movie title and the Java title for providing information to the reproducing apparatus.

15. A recording medium storing a data structure for managing reproduction of titles having different data formats by a reproducing apparatus comprising:
   a data area including a movie title and a Java title; and
   a data management area including a movie object file having management information for managing reproduction of the movie title by the reproducing apparatus, and an index file having index information of the movie title and the Java title for providing information to the reproducing apparatus, wherein the data management area further includes a Java program file having Java object information for managing reproduction of the Java title by the reproducing apparatus.

16. A method of reproducing data recorded on a recording medium which includes a data area having a movie title and a Java title and a data management area having management information for reproducing the movie title and the Java title, the method comprising:
   extracting, at a reproducing apparatus, index information of the movie title and the Java title from the data management area;
   executing, at a reproducing apparatus, a first object associated with reproduction of the movie title and designated by the index information when a command for reproducing the movie title is inputted; and
   executing. at a reproducing apparatus, a second object associated with reproduction of the Java title and designated by the index information when a command for reproducing the Java title is inputted.

17. The method of claim 16, wherein the first object is for managing reproduction of the movie title, and the second object is for managing reproduction of the Java title.

18. A method of reproducing data recorded on a recording medium which includes a data area having a movie group and a Java group of titles and a data management area having management information for reproducing the movie title and the Java title, the method comprising:
   extracting, at a reproducing apparatus, a first index file including index information of the movie title from the data management area;
   extracting, at a reproducing apparatus, a second index file including index information of the movie title and the Java title from the data management area;
   providing, at a reproducing apparatus, a first list of a movie group of titles to a user when only the movie group of titles are reproducible;
   providing, at a reproducing apparatus, a second list of the movie group and a Java group of titles to the user when both of the movie group and the Java group of titles are reproducible; and
   reproducing, at a reproducing apparatus, a title which the user selects from the first or second list of titles.

19. The method of claim 18, wherein the data management area includes at least one object.

20. The method of claim 19, wherein the at least one object is one of a movie object and a Java object.

21. An apparatus of for reproducing data recorded on a recording medium which includes a data area having at least a movie title and a Java title and a data management area having management Information for reproducing the movie title and the Java title, the apparatus comprising:

a microcomputer configured to generate a control signal to read index information of the movie title and the Java title included in at least one index file, and to read object information of the movie title and the Java title which is contained in at least one object file, the at least one index file and the at least one object file being included in the data management area; and a player model configured to reproduce a title selected by a user using the index and object information extracted from the data management area.

22. The method of claim 21, wherein the at least one object file is at least one of a movie object file for managing reproduction of the movie title and a Java object file for managing reproduction of the Java title.

23. The method of claim 22, wherein the movie object file includes a plurality of movie objects and the Java object file includes a plurality of Java objects.

* * * * *